United States Patent
Ranjit et al.

(10) Patent No.: US 10,572,639 B2
(45) Date of Patent: Feb. 25, 2020

(54) SELECTIVELY PROVIDING PERSONAL INFORMATION AND ACCESS TO FUNCTIONALITY ON LOCK SCREEN BASED ON BIOMETRIC USER AUTHENTICATION

(71) Applicant: Microsoft Technology Licensing, LLC, Redmond, WA (US)

(72) Inventors: Sangeeta Ranjit, Newcastle, WA (US); Craig T. McIntyre, Kirkland, WA (US); Kanna Ramasubramanian, Bellevue, WA (US); Peter Dawoud Shenouda Dawoud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 15/069,574

(22) Filed: Mar. 14, 2016

(65) Prior Publication Data

US 2016/0275281 A1    Sep. 22, 2016

Related U.S. Application Data

(60) Provisional application No. 62/134,412, filed on Mar. 17, 2015.

(51) Int. Cl.
*G06F 21/32* (2013.01)
(52) U.S. Cl.
CPC .................... *G06F 21/32* (2013.01)
(58) Field of Classification Search
CPC ....................................................... G06F 21/32

(Continued)

(56) References Cited

U.S. PATENT DOCUMENTS

| | | | |
|---|---|---|---|
| 7,260,724 B1* | 8/2007 | Dickinson | H04L 63/08 713/182 |
| 7,690,032 B1* | 3/2010 | Peirce | G06F 21/32 380/229 |

(Continued)

FOREIGN PATENT DOCUMENTS

| | | |
|---|---|---|
| CN | 103559455 A | 2/2014 |
| CN | 104036177 A | 9/2014 |
| EP | 2515526 A2 | 10/2012 |

OTHER PUBLICATIONS

"Second Written Opinion Issued in PCT Application No. PCT/US2016/022354", dated Feb. 2, 2017, 7 Pages.

(Continued)

*Primary Examiner* — Lisa C Lewis
*Assistant Examiner* — Thanh T Le
(74) *Attorney, Agent, or Firm* — Fiala & Weaver P.L.L.C.

(57) ABSTRACT

A computing device is described that selectively displays or suppresses personalized information on a lock screen based on the results of a biometric user authentication process. In embodiments, a measure of confidence that a user of the computing device is an authorized user is determined based on biometric data collected by one or more biometric sensors. If it is determined that the measure of confidence satisfies a criterion, then personal information associated with the user is selectively rendered to the lock screen while the computing device is in the locked state. If it determined that the measure of confidence does not satisfy the criterion, then such personal information may be suppressed from the lock screen. The application of the foregoing technique to selectively provide or deny access to certain functionality of the computing device via the lock screen is also described.

20 Claims, 11 Drawing Sheets

(58) Field of Classification Search
USPC .......................................................... 726/19
See application file for complete search history.

(56) References Cited

U.S. PATENT DOCUMENTS

| | | | |
|---|---|---|---|
| 7,774,851 B2 | 8/2010 | Singh et al. | |
| 8,331,992 B2* | 12/2012 | Stallings | G06F 3/0488 455/412.2 |
| 8,458,465 B1* | 6/2013 | Stern | G06F 21/32 713/166 |
| 8,462,949 B2 | 6/2013 | Anderson et al. | |
| 8,594,374 B1 | 11/2013 | Bozarth | |
| 8,831,557 B2 | 9/2014 | Jung et al. | |
| 9,230,076 B2* | 1/2016 | King | G06F 21/53 |
| 9,236,052 B2* | 1/2016 | Timem | G06F 21/32 |
| 9,286,482 B1* | 3/2016 | Dumont | G06F 21/32 |
| 9,400,879 B2* | 7/2016 | Tredoux | H04L 9/3231 |
| 9,778,837 B2* | 10/2017 | Shepherd | G06F 3/0482 |
| 2005/0125295 A1* | 6/2005 | Tidwell | G06Q 20/042 705/16 |
| 2005/0247776 A1* | 11/2005 | Harper | G07C 9/00087 235/380 |
| 2005/0270386 A1 | 12/2005 | Saitoh et al. | |
| 2007/0143629 A1* | 6/2007 | Hardjono | H04L 63/0823 713/189 |
| 2009/0273562 A1 | 11/2009 | Baliga et al. | |
| 2009/0276823 A1* | 11/2009 | Vogler | G06F 21/316 726/1 |
| 2009/0282473 A1* | 11/2009 | Karlson | H04L 63/102 726/17 |
| 2010/0251127 A1* | 9/2010 | Geppert | G06F 3/04817 715/735 |
| 2011/0246766 A1* | 10/2011 | Orsini | G06F 11/1076 713/160 |
| 2012/0023573 A1* | 1/2012 | Shi | G06F 3/04883 726/17 |
| 2012/0084734 A1* | 4/2012 | Wilairat | G06F 21/36 715/863 |
| 2012/0166818 A1* | 6/2012 | Orsini | H04L 9/085 713/193 |
| 2012/0185916 A1* | 7/2012 | Chae | G06F 21/316 726/2 |
| 2012/0284297 A1* | 11/2012 | Aguera-Arcas | G06F 3/03547 707/769 |
| 2012/0311499 A1* | 12/2012 | Dellinger | H04N 5/23206 715/835 |
| 2013/0145453 A1* | 6/2013 | Lemke | G06F 21/31 726/16 |
| 2013/0191911 A1* | 7/2013 | Dellinger | G06F 3/0488 726/19 |
| 2013/0307670 A1* | 11/2013 | Ramaci | G06F 21/6245 340/5.82 |
| 2013/0342672 A1 | 12/2013 | Gray et al. | |
| 2014/0033326 A1* | 1/2014 | Chien | H04W 12/08 726/28 |
| 2014/0095994 A1 | 4/2014 | Kim | |
| 2014/0096178 A1* | 4/2014 | Shippy | G06F 21/316 726/1 |
| 2014/0250518 A1* | 9/2014 | Schneider | G06F 21/34 726/9 |
| 2014/0283135 A1 | 9/2014 | Shepherd et al. | |
| 2014/0325220 A1* | 10/2014 | Tunnell | G06F 21/00 713/168 |
| 2015/0003691 A1 | 1/2015 | Joo et al. | |
| 2015/0213245 A1* | 7/2015 | Tartz | G06F 21/32 726/17 |
| 2015/0350147 A1* | 12/2015 | Shepherd | H04L 51/24 715/752 |
| 2015/0358317 A1* | 12/2015 | Deutschmann | H04L 63/0861 713/186 |
| 2016/0259924 A1* | 9/2016 | Dutt | H04L 63/1416 |
| 2016/0269881 A1* | 9/2016 | Klappert | G06K 9/00013 |
| 2017/0277876 A1* | 9/2017 | Alameh | G06T 7/20 |
| 2018/0068106 A1* | 3/2018 | John Archilbald | G06F 21/32 |

OTHER PUBLICATIONS

"International Preliminary Report on Patentability Issued in PCT Application No. PCT/US2016/022354", dated May 11, 2017, 8 Pages.

"International Search Report and Written Opinion Issued in PCT Application No. PCT/US2016/022354", dated May 18, 2016, 12 Pages.

Fischer, et al., "Short Paper: Smartphones: Not Smart Enough?", In Proceedings of the Second ACM Workshop on Security and Privacy in Smartphones and Mobile Devices, Oct. 19, 2012, 6 Pages.

Riva, et al., "Progressive Authentication: Deciding When to Authenticate on Mobile Phones", In Proceedings of the 21st USENIX Conference on Security Symposium, Aug. 8, 2012, 16 Pages.

"Software Protection From Prying Eyes", Published on: Dec. 29, 2013, Available at: <http://www.privateeyeenterprise.com/how-it-works/>, 3 pages.

"How-To Guides", Retrieved on: Mar. 18, 2015, Available at: <http://www.samsung.com/us/support/howtoguide/N0000407/9669/108748/SCH-I925EAAVZW>, 17 pages.

"Lock Screen", Retrieved on: Mar. 18, 2015, Available at: <http://eguides.sprint.com/support/eguides/samsunggalaxytab3/index.html#samsung_galaxy_tab_3_ug/lock_screen.html>, 1 page.

Hornyak, Tim, "Fujitsu Demos Iris Scanner that Unlocks Smartphones", Published on: Mar. 1, 2015 Available at: <http://www.pcworld.com/article/2890972/fujitsu-demos-iris-scanner-that-unlocks-smartphones.html>, 4 pages.

"First Office Action and Search Report Issued in Chinese Patent Application No. 201680016183.3", dated Oct. 8, 2019, 25 Pages.

* cited by examiner

802 — In response to determining that the first measure of confidence does not satisfy at least the first criterion, selectively removing personal information associated with the authorized user from the lock screen

902 — Generate a second measure of confidence that the user of the computing device is the authorized user based on one or more additional biometric matching determinations 904 — Determine whether the second measure of confidence satisfies at least a second criterion 906 — In response to determining that the second measure of confidence satisfies at least the second criterion, selectively rendering second personal information associated with the authorized user to the lock screen

FIG. 9

In response to determining that the first measure of confidence does not satisfy at least the first criterion, selectively prohibiting access to the first functionality of the computing device while the computing device is in the locked state ─1202

Generate a second measure of confidence that the user of the computing device is the authorized user based on one or more additional biometric matching determinations ─1302

Determine whether the second measure of confidence satisfies at least a second criteria ─1304

In response to determining that the second measure of confidence satisfies at least the second criterion, selectively providing access to second functionality of the computing device while the computing device is in the locked state ─1306

FIG. 13

SELECTIVELY PROVIDING PERSONAL INFORMATION AND ACCESS TO FUNCTIONALITY ON LOCK SCREEN BASED ON BIOMETRIC USER AUTHENTICATION

CROSS-REFERENCE TO RELATED APPLICATIONS

This application claims priority to U.S. Provisional Patent Application No. 62/134,412, filed Mar. 17, 2015, the entirety of which is incorporated by reference herein.

BACKGROUND

Many conventional computing devices, including smart phones and tablets, are configured to present a "lock screen" when powered on or when transitioned from a power-saving state to a full-power state. The lock screen comprises a visual interface that is displayed before the user has entered a passcode (or supplied some other credential) that is required to activate the full functionality of the computing device. If the user cannot supply the appropriate credential, the user cannot get past the lock screen and the device will remain in a locked state.

Since a lock screen can be accessed even by unauthorized persons, computing devices that utilize lock screens typically limit the types of information that can be presented thereto. For example, the lock screen may be restricted to displaying only basic information such as the date and time, a signal reception indicator, a network indicator, and/or a battery status indicator. Likewise, computing devices that utilize lock screens typically limit the types of functionality that can be accessed via the lock screen. For example, the lock screen may be used to display received text messages but may prohibit a user from responding to them. As another example, the lock screen may provide access to camera functionality of the computing device for the purposes of taking pictures but may not allow a user to access photos stored on the computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described for selectively displaying or suppressing personal information on a lock screen of a computing device based on the results of a biometric user authentication process. In accordance with embodiments, biometric data associated with a user of the computing device is obtained from one or more biometric sensors and such biometric data is used to generate one or more biometric matching determinations. A measure of confidence that the user of the computing device is an authorized user is determined based on the one or more biometric matching determinations. If it is determined that the measure of confidence satisfies one or more criteria, then personal information associated with the user is selectively rendered to the lock screen while the computing device is in the locked state. If it determined that the measure of confidence does not satisfy the one or more criterion, then such personal information may be suppressed from the lock screen. The foregoing technique may also be applied to selectively provide or deny access to certain functionality of the computing device via the lock screen.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 8 depicts an additional step that may be performed in conjunction with the method shown in FIG. 7.

FIG. 9 depicts a flowchart of an additional method for selectively presenting personal information to a lock screen of a computing device that may be performed in conjunction with the method shown in FIG. 7.

FIG. 12 depicts an additional step that may be performed in conjunction with the method shown in FIG. 11.

FIG. 13 depicts a flowchart of an additional method for selectively providing access to functionality via a lock screen of a computing device that may be performed in conjunction with the method shown in FIG. 11.

Figure 1:
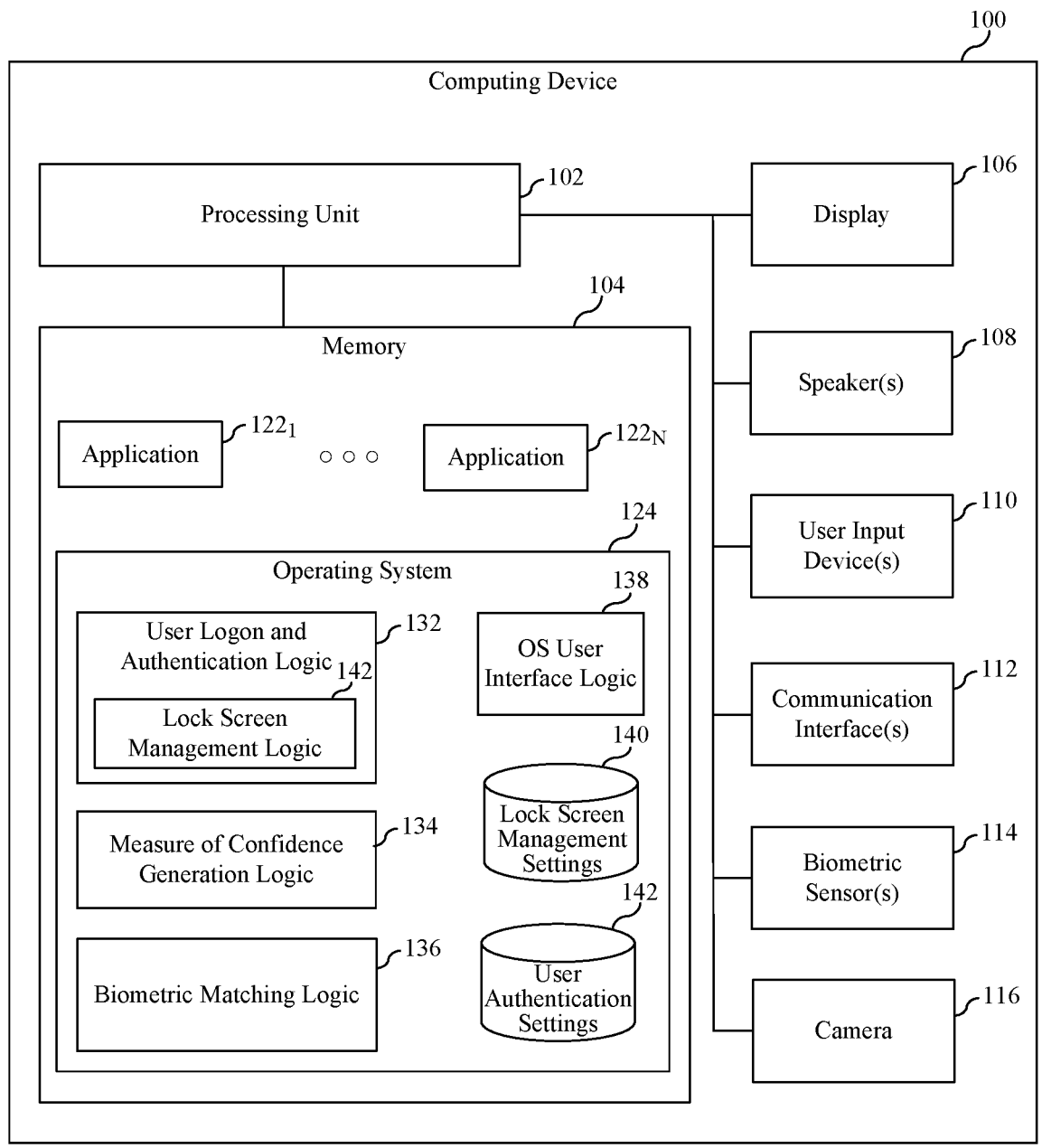
FIG. 1 is a block diagram of a computing device in accordance with an embodiment that selectively displays personal information and selectively provides access to functionality on a lock screen based on a biometric user authentication process.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As noted in the Background Section, above, many conventional computing devices, including smart phones and tablets, are configured to present a "lock screen" when powered on or when transitioned from a power-saving state to a full-power state. The lock screen comprises a visual interface that is displayed before the user has entered a passcode (or supplied some other credential) that is required to activate the full functionality of the computing device. If the user cannot supply the appropriate credential, the user cannot get past the lock screen and the device will remain in a locked state.

Since a lock screen can be accessed even by unauthorized persons, computing devices that utilize lock screens typically limit the types of information that can be presented thereto. For example, the lock screen may be restricted to displaying only basic information such as the date and time, a signal reception indicator, a network indicator, and/or a battery status indicator. Likewise, computing devices that utilize lock screens typically limit the types of functionality that can be accessed via the lock screen. For example, the lock screen may be used to display received text messages but may prohibit a user from responding to them. As another example, the lock screen may provide access to camera functionality of the computing device for the purposes of taking pictures but may not allow a user to access photos stored on the computing device.

Some conventional computing devices that utilize a lock screen may provide a user with a limited degree of control over whether certain personal information is presented to the lock screen as well as whether certain functionality is accessible via the lock screen. For example, via a "settings" menu that is accessible when the computing device is in an unlocked state, a user may be permitted to select certain types of personal information or functionality that can be accessed via the lock screen. However, such conventional computing devices require the user to make a difficult choice. On the one hand, if the user opts to provide access to the personal information/functionality via the lock screen, then if the computing device falls into the wrong hands, a malicious party may be able to access the user's personal information and/or utilize functionality of the user's computing device without having to unlock it. On the other hand, if the user opts to suppress access to the personal information/functionality via the lock screen, then the user will not be able to quickly and easily access such personal information/functionality without first going through the process of unlocking the computing device.

Embodiments described herein address these and other issues associated with conventional computing devices. In particular, computing devices described herein are capable of selectively presenting or suppressing personal information on a lock screen thereof based on a biometrically-derived measure of confidence that a user of the computing device is an authorized user. For example, in accordance with certain embodiments, if the computing device determines based on biometric sensing that a user currently in possession of the computing device is more likely than not an authorized user, then the computing device will display certain personal information on the lock screen that it wouldn't otherwise display. However, if the computing device determines based on biometric sensing that the user is more likely than not an unauthorized user, then the computing device will prevent such personal information from being displayed on the lock screen. In accordance with further embodiments, the type or amount of personal information displayed on the lock screen can be tied to the measure of confidence, such that an increase in the measure of confidence results in an increase in the types or amount of personal information displayed via the lock screen. Of course, these are merely examples of the inventive technique and a variety of other implementations and use cases will be described herein. A similar approach to that described above can be used to selectively provide or deny access to certain functionality of a computing device via its lock screen.

In this way, embodiments described herein enable an authorized user to obtain access to certain personal information and functionality of a computing device via the lock screen thereof without having to go through the process of unlocking the device and without having to worry about an unauthorized user gaining access to such personal information and functionality.

In Section II, below, various embodiments of a computing device that selectively displays personal information and/or provides access to functionality via a lock screen based on a biometric user authentication will be described. Section III describes an exemplary mobile device that may be used to implement the features described in Section II. Section IV describes an exemplary desktop computer that may be used to implement the features described in Section II. Section V describes some additional exemplary embodiments. Section VI provides some concluding remarks.

II. Example Embodiments for Selectively Providing Personal Information and Access to Functionality Via a Lock Screen of Computing Device Based on Biometric User Authentication FIG. 1 is a block diagram of a computing device 100 in accordance with an embodiment that selectively presents personal information and access to functionality on a lock screen based on a biometric user authentication process.

Computing device 100 is intended to represent a processor-based electronic device that is capable of executing software that is installed thereon as well as perform other functions. In one embodiment, computing device 100 comprises a mobile computing device such as a mobile phone (e.g., a smart phone), a laptop computer, a tablet computer, a netbook, a handheld gaming console, a wearable computing device, or any other mobile computing device capable of providing the features described herein. One example of a mobile device that may incorporate the functionality of computing device 100 will be discussed below in reference to FIG. 14. In another embodiment, computing device 100 comprises a desktop computer, a gaming console, or other non-mobile computing platform that is capable of executing software that is installed thereon as well as perform other functions. An example desktop computer that may incorporate the functionality of computing device 100 will be discussed below in reference to FIG. 15.

As shown in FIG. 1, computing device 102 includes a plurality of interconnected components, including a processing unit 102, memory 104, a display 106, one or more speakers 108, one or more user input devices 110, one or more communication interfaces 112, one or more biometric sensors 114, and a camera 116. Each of these components will now be described.

Processing unit 102 is intended to represent one or more microprocessors, each of which may include one or more central processing units (CPUs) or microprocessor cores. Processing unit 102 operates in a well-known manner to execute computer programs (also referred to herein as computer program logic). The execution of such computer programs causes processing unit 102 to perform operations including operations that will be described herein. Each of memory 104, display 106, speaker(s) 108, user input device(s) 110, communication interface(s) 112, biometric sensor(s) 114 and camera 116 is connected to processing unit 102 via one or more suitable interfaces.

Memory 104 comprises one or more computer-readable memory devices that operate to store computer programs and data. Memory 104 may include non-volatile memory as well as volatile memory. The non-volatile memory may be implemented using any of a wide variety of non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives. The volatile memory may be implemented using any of a wide variety of volatile computer-readable memory devices including, but not limited to, random access memory (RAM) devices.

Display 106 comprises a device to which content, such as text and images, can be rendered so that it will be visible to a user of computing device 100. Some or all of the rendering operations required to display such content may be performed at least in part by processing unit 102. Some or all of the rendering operations may also be performed by a display device interface such as a video or graphics chip or card (not shown in FIG. 1) that is coupled between processing unit 102 and display 106. Depending upon the implementation of computing device 100, display 106 may comprise a device that is integrated within the same physical structure or housing as processing unit 102 or may comprise a monitor, projector, or other type of device that is physically separate from a structure or housing that includes processing unit 102 and connected thereto via a suitable wired and/or wireless connection.

Speaker(s) 108 comprise one or more electroacoustic transducers that produce sound in response to an electrical audio signal. Speaker(s) 108 provide audio output to a user of computing device 100. Some or all of the operations required to produce electrical audio signal(s) that are received by speaker(s) 108 may be performed by processing unit 102. Some or all of these operations may also be performed by an audio interface such as an audio chip or card (not shown in FIG. 1) that is coupled between processing unit 102 and speaker(s) 108. Depending upon the implementation of computing device 100, speaker(s) 108 may comprise device(s) that are integrated within the same physical structure or housing as processing unit 102 or may comprise external speaker(s) that are physically separate from a structure or housing that includes processing unit 102 and connected thereto via suitable wired and/or wireless connections.

User input device(s) 110 comprise one or more devices that operate to generate user input information in response to a user's manipulation or control thereof. Such user input information is passed via a suitable interface to processing unit 102 for processing thereby. Depending upon the implementation, user input device(s) 110 may include a touch screen (e.g., a touch screen integrated with display 106), a keyboard, a keypad, a mouse, a touch pad, a trackball, a joystick, a pointing stick, a wired glove, a motion tracking sensor, a game controller or gamepad, a microphone, or a video capture device such as a camera. However, these examples are not intended to be limiting and user input device(s) 110 may include other types of devices other than those listed herein. Depending upon the implementation, each user input device 110 may be integrated within the same physical structure or housing as processing unit 102 (such as an integrated touch screen, touch pad, or keyboard on a mobile device) or may be physically separate from a physical structure or housing that includes processing unit 102 and connected thereto via a suitable wired and/or wireless connection.

Communication interface(s) 114 comprise one or more interfaces that enable computing device 100 to communicate with other devices via a network-based or peer-to-peer connection. For example, communication interface(s) 114 may comprise a wired communication interface such as a USB or Ethernet interface or a wireless communication interface such as a BLUETOOTH®, IEEE 802.11 ("Wi-Fi") or 3G communication interface. However, these are examples only and are not intended to be limiting.

Biometric sensor(s) 114 comprise one or more sensors that are operable to collect data that can then be used to verify or recognize the identity of a living person based on a physiological or behavioral characteristic thereof. By way of example only, biometric sensor(s) 114 may include one or more of a fingerprint recognition sensor, a palm print recognition sensor, a face recognition sensor, an iris recognition sensor, a retina recognition sensor, a voice recognition sensor, a hand vascular pattern recognition sensor, a DNA recognition sensor, and a signature recognition sensor. Persons skilled in the relevant art(s) will appreciate that a variety of different types of hardware may be used to support each of these different sensor types. For example, an infrared (IR) camera may be used to support face or iris recognition. Accordingly, these sensor types are not limited to any particular hardware implementation. Furthermore, the foregoing list of example biometric sensor types is not intended to be limiting, and biometric sensor(s) 114 may include other types of sensor for capturing biometric data, whether currently in existence or developed in the future.

Biometric sensor(s) 114 may be capable of capturing data that relates to physiological characteristics of an individual (e.g., fingerprints, palm prints, facial features, iris features, retinal features, hand vascular pattern, DNA, heart rate, skin resistance, skin temperature, muscle tension, electrodermal activity and neuronal activity) as well as data that relates to behavioral characteristics of an individual. For example, behavioral characteristics about which data may be obtained by biometric sensor(s) 114 may include, but are not limited to, voice patterns, features associated with content written by a user (e.g., a signature), user input device interaction characteristics (e.g., a user's typing speed and/or rhythm as well as other distinctive aspects concerning how a user tends to interact with a given user input device), a manner in which a user holds computing device 100, a walking or running gait, or the like. These examples are not intended to be limiting and other data relating to physiological and/or behavioral characteristics of a person may be captured by biometric sensor(s) 114.

Depending upon the implementation of computing device 100, each biometric sensor 114 may be integrated within the same physical structure or housing as processing unit 102 or may be physically separate from a physical structure or housing that includes processing unit 102 and connected thereto via a suitable wired and/or wireless connection.

In some embodiments, biometric data may be delivered to computing device 100 from a separate device that is communicatively connected to computing device 100 via one of communication interface(s) 112. For example, a fitness device worn by a user or some other device may utilize its own biometric sensor(s) to collect biometric data and deliver it to computing device 100 via one of communication interface(s) 112.

Camera 116 comprises a well-known device that is operable to capture images and video content which may be stored in memory 104. Camera 116 may also be thought of as one of user input device(s) 110 in a scenario in which it is used to receive user input. Furthermore, if camera 116 is used to capture biometric data, it may also be considered one of biometric sensor(s) 114.

As further shown in FIG. 1, memory 104 stores a number of software components including a plurality of applications $122_1$-$122_N$ and an operating system 124.

Each application in plurality of applications $122_1$-$122_N$ comprises a computer program that a user of computing device 100 may cause to be executed by processing unit 102. The execution of each application causes certain operations to be performed on behalf of the user, wherein the type of operations performed will vary depending upon how the application is programmed. Applications $122_1$-$122_N$ may include, for example and without limitation, a telephony application, an e-mail application, a messaging application, a Web browsing application, a calendar application, a utility application, a game application, a social networking application, a microblogging application, a music application, a productivity application, a lifestyle application, a reference application, a travel application, a sports application, a navigation application, a healthcare and fitness application, a news application, a photography application, a finance application, a business application, an education application, a weather application, a books application, a medical application, or the like.

Operating system 124 comprises a set of programs that manage resources and provide common services for applications that are executed on computing device 100, such as applications $122_1$-$122_N$. Among other components, operating system 124 comprises operating system (OS) user interface logic 138, user logon authentication logic 132, measure of confidence generation logic 134 and biometric matching logic 136. Each of these components may be executed by processing unit 102 to perform operations that will be described herein.

OS user interface 138 comprises a component of operating system 124 that generates a user interface by which a user can interact with operating system 124 for various purposes, such as but not limited to finding and launching applications, invoking certain operating system functionality, and setting certain operating system settings. In one embodiment, OS user interface logic 138 provides a touch-screen based graphical user interface (GUI), although this is only an example. In further accordance with such an example, each application $122_1$-$122_N$ installed on computing device 100 may be represented as an icon or tile within the GUI and invoked by a user through touch-screen interaction with the appropriate icon or tile. However, any of a wide variety of alternative user interface models may be provided by OS user interface logic 138.

User logon and authentication logic 132 comprises computer program logic that is executed by operating system 124 when computing device 100 is powered on. User logon and authentication logic 132 may also be executed by operating system 124 when computing device 100 is transitioned from a power-saving or standby state to a full-power state. Generally speaking, user logon and authentication logic 132 operates to maintain computing device 100 in a locked state until such time as a user thereof has successfully completed a user authentication process. In the locked state, the full features and functionality of computing device 100 are rendered inaccessible to a user of computing device 100. For example, in the locked state, the user may be unable to access OS user interface 138 as well as any of application $122_1$-$122_N$.

Successful completion of the user authentication process requires one or more credential(s) to be supplied by or on behalf of the user. To enable the user to supply the credential(s), user logon and authentication logic 132 may present a user with a user interface by which the user can type in an alphanumeric password or numeric passcode, input a unique gesture via a touch screen, or provide some other form of user input. Additionally or alternatively, user logon and authentication logic 132 may also initiate (automatically or in response to user input) a biometric-based user authentication process. In accordance with a biometric-based user authentication process, a credential sufficient for authenticating a user may be returned to user logon and authentication logic 132 if biometric matching logic 136 determines that a biometric match with an authorized user has been achieved. Biometric matching logic 136 may render such a determination based on data obtained from one or more of biometric sensor(s) 114.

Once the user has successfully completed the user authentication process, user logon and authentication logic 132 will transition computing device 100 from the locked stated to an unlocked state. In the unlocked state, the full features and functionality of computing device 100 are rendered accessible to a user of computing device 100. For example, in the unlocked state, the user may be able to access OS user interface 138 as well as any of application $122_1$-$122_N$.

As further shown in FIG. 1, user logon and authentication logic 132 includes lock screen management logic 142. Lock screen management logic 142 is computer program logic that is configured to present a visual interface that may be referred to as a "lock screen" to display 106 while computing device 100 is in the locked state. In embodiments, the lock screen may include or provide a means for accessing a user interface by which a user can supply a credential necessary for unlocking computing device 100. Additionally, in certain embodiments, the lock screen may include or provide a means for accessing a user interface by which a user can select among and initiate different credential-supplying methods (e.g., traditional alphanumeric password, gesture-based password, biometric checking, etc.) for unlocking computing device 100.

As will be discussed in more detail herein, lock screen management logic 142 is also configured to selectively present personal information about an authorized user to the lock screen based on whether a biometrically-determined measure of confidence satisfies at least one criterion. Lock screen management logic 142 may also be configured to selectively provide access to certain functionality of computing device 100 via the lock screen if the biometrically-determined measure of confidence satisfies at least one criterion.

Biometric matching logic 136 is computer program logic that is configured to obtain biometric data from one or more of biometric sensor(s) 114 and to utilize such data to determine if a user of computing device 100 has features (e.g., physiological or behavioral features) that match those of an authorized user of computing device 100. As noted above, in certain embodiments, a determination by biometric matching logic 136 that a user has features that match those of an authorized user may comprise a credential sufficient to cause user logon and authentication logic 132 to transition computing device 100 from the locked state to the unlocked state.

Furthermore, in an embodiment, matching determinations generated by biometric matching logic 136 may also be supplied to measure of confidence generation logic 134. Measure of confidence generation logic 134 comprises computer program logic that is configured to receive one or more matching determinations from biometric matching logic 136 and, based on the matching determinations, generate a measure of confidence that a user of computing device 100 is an authorized user of computing device 100. Measure of confidence generation logic 134 is further configured to provide the measure of confidence to lock screen management logic 142. Based on the measure of confidence received from measure of confidence generation logic 134, lock screen management 142 may selectively present personal information about an authorized user to the lock screen and/or selectively provide access to certain functionality of computing device 100 via the lock screen.

Figure 2:
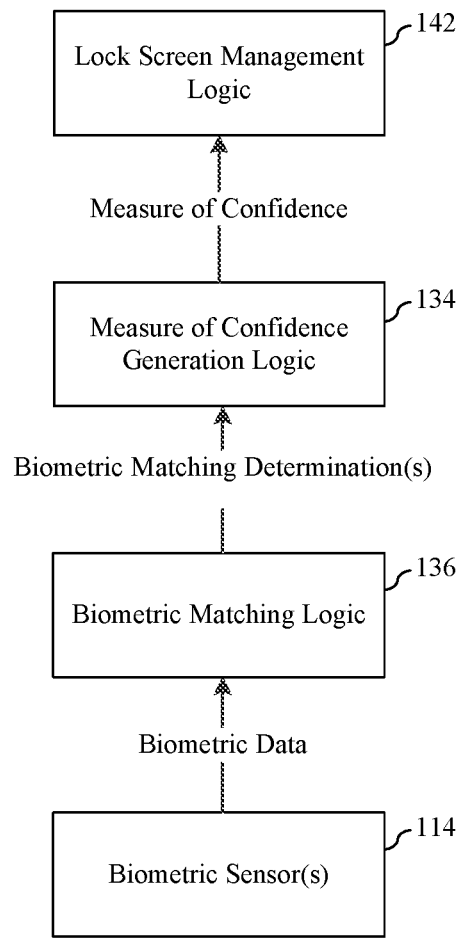
FIG. 2 is a block diagram that show components of the computing device of FIG. 1 and the interactions therebetween that support the selective providing of personal information and access to device functionality via a lock screen.

The components of computing device 100 and the interactions therebetween that support such selective providing of personal information and access to functionality via the lock screen will now be further described in reference to FIG. 2. In one embodiment, user logon and authentication logic 132 automatically activates the components shown in FIG. 2 to perform the functions described herein while computing device 100 is in the locked state and a lock screen is being rendered to display 106. The components may also be activated in response to some predefined trigger while computing device 100 is in the locked state. For example and without limitation, the components may be activated in response to the detected presence of a user by one or more of biometric sensor(s) 114, or by other sensors or components associated with computing device 100.

As shown in FIG. 2, biometric sensor(s) 114 operate to obtain biometric data and to provide such biometric data to biometric matching logic 136. As will be appreciated by persons skilled in the relevant art(s), the type of biometric data that will be generated will likely vary by biometric sensor type. For example, for a facial recognition sensor, the biometric data may comprise a set of facial features or an image from which such set of facial features may be extracted. As another example, for a fingerprint sensor, the biometric data may comprise a set of fingerprint features or a fingerprint image from which such set of fingerprint features may be extracted.

As further shown in FIG. 2, biometric matching logic 136 receives the biometric data from biometric sensor(s) 114. Based on the received biometric data, biometric matching logic 136 generates one or more biometric matching determinations which are then passed to measure of confidence generation logic 134. As will be appreciated by persons skilled in the relevant art(s), the manner in which a matching determination is made may vary depending upon biometric sensor type. For example, for a facial recognition sensor, a matching determination may be rendered by comparing a set of obtained facial features with one or more stored facial feature templates respectively associated with one or more authorized users. As another example, for a fingerprint sensor, a matching determination may be rendered by comparing a set of obtained fingerprint features with one or more stored fingerprint feature templates respectively associated with one or more authorized users.

The types of biometric matching determinations that may be generated by biometric matching logic 136 may also vary by biometric sensor type. For example, for certain biometric sensors, the complete set of possible biometric matching determinations may simply comprise either a successful match or no match. For other biometric sensors, the set of possible biometric matching determinations may further include an indication that a person has been perceived by a biometric sensor but that the person is currently unrecognized. For example, biometric data obtained by a facial recognition sensor may indicate that a face has been perceived by the sensor but the face is not currently recognized. For still other biometric sensors, the set of possible biometric matching determinations may include a measure of confidence that a person is a match. The measure of confidence, for example, may be a value on some scale that extends from a value indicative of no match to a value indicative of a complete match. Still other types of matching determinations may be generated for each biometric sensor.

With continued reference to FIG. 2, measure of confidence generation logic 134 receives the one or more biometric matching determinations from biometric matching logic 136 and based on the received biometric matching determination(s), generates an overall measure of confidence that a user of computing device 100 is an authorized user. This measure of confidence is then provided to lock screen management logic 142. A wide variety of different methods may be used to generate the measure of confidence depending upon the implementation.

For example, in an embodiment in which only a single biometric sensor is utilized by computing device 100, the measure of confidence may be generated based on a single matching determination associated with the single biometric sensor. This may involve mapping or converting the matching determination for the single biometric sensor into the measure of confidence to be provided to lock screen management logic 142. Alternatively, the biometric matching determination provided by the single biometric sensor may itself comprise the measure of confidence that is provided to lock screen management logic 142. However, these are only examples, and any of a wide variety of methods may be used to generate a measure of confidence based on a matching determination received for a single biometric sensor.

As another example, in an embodiment in which multiple biometric sensors are utilized by computing device 100, the measure of confidence may be generated by an algorithm that takes into account the results of the various matching determinations generated for the multiple biometric sensors. For example, if none of the biometric determinations indicate a match, then this may translate into a very low measure of confidence. However, if all of the biometric determinations indicate a match, then this may translate into a very high measure of confidence. Still further, if some of the biometric determinations indicate a match but some do not, this may translated into an intermediate measure of confidence. However, these are only examples, and any of a wide variety of methods may be use to generate a measure of confidence based on matching determinations received for multiple biometric sensors.

In an embodiment, the determination of how the matching determinations generated by biometric matching logic 136 translate into various measures of confidence may be controlled by certain settings. Such settings may comprise part of a set of user authentication settings 142 stored in memory 104 of computing device 100 (see FIG. 1). In one embodiment, the settings are specified by a developer and are not modifiable by a user. In an alternate embodiment, the settings are configurable by an authorized user of computing device 100. This feature enables, for example, an authorized user to specify what types of biometric matching determinations should produce a particular measure of confidence. For example, a user who is deeply concerned about security may require positive matches from multiple different biometric sensors in order to produce a high measure of confidence, while a user who is not as concerned about security may require only one positive match from a single biometric sensor in order to produce a high measure of confidence. In still another embodiment, the settings may be configurable by a system administrator in an enterprise.

Returning again to the description of FIG. 2, the measure of confidence generated by measure of confidence generator 134 is received by lock screen management logic 142. Based on the received measure of confidence, lock screen management logic 142 determines whether and what type of personal information should be rendered to the lock screen, and renders such personal information (if any) to the lock screen. Additionally or alternatively, based on the received measure of confidence, lock screen management logic 142 determines whether and what type of functionality should be rendered accessible to a user via the lock screen, and provides access to such functionality (if any) via the lock screen.

For example, in one embodiment, when the measure of confidence that the user is an authorized user is relatively low (e.g., below a certain threshold), lock screen management logic 142 will present no personal information to the lock screen. In this case, lock screen management logic 142 may only present non-personal information on the lock screen. Such non-personal information may include, for example and without limitation, a current date and time, a signal reception indicator associated with a telecommunication network, one or more network indicators that identify network(s) to which computing device 100 is communicatively connected, and/or a battery status indicator that indicates the status of a battery being used to power computing device 100.

In further accordance with this example, when the measure of confidence that the user is an authorized user is relatively high (e.g., above a certain threshold), lock screen management logic 142 will present certain personal information associated with the authorized user to the lock screen. A wide variety of different types of personal information may be presented to the lock screen when lock screen management 142 determines that the measure of confidence is sufficiently high. For example and without limitation, the personal information may include a notification concerning a communication (e.g., phone call, e-mail or text message) received by the authorized user, a reminder about a task associated with the authorized user (e.g., a task being tracked by a calendar application, a to-do-list application, or the like), some or all of a message (e.g., e-mail or text message) received by the authorized user, an identifier of the authorized user (e.g., a name, account name, e-mail address, or other identifier of the authorized user), an identifier of a party calling the authorized user, an image associated with the authorized user (e.g., an image of and/or selected by the authorized user), calendar information associated with the authorized user, a personalized greeting associated with the authorized user, health-related data associated with the authorized user, information concerning events deemed to be of interest to the authorized user, and geographical information associated with the authorized user (e.g., walking or driving directions requested by the authorized user or a map showing the authorized user's location and/or trajectory). However, there are merely a few examples and persons skilled in the relevant art(s) will readily appreciate that lock screen management logic 142 may present a wide variety of personal information associated with an authorized user to the lock screen when the measure of confidence is deemed sufficiently high.

In one embodiment, the personal information that may be presented to the lock screen may be organized into different groups or tiers. For example, the personal information that may be presented to the lock screen may be organized into different tiers based on how sensitive a user would be to inadvertently sharing such personal information with third parties, such as a low-sensitivity tier, a moderate-sensitivity tier, and a high-sensitivity tier. In further accordance with this example, lock screen management logic 142 may be configured to present the low-sensitivity personal information to the lock screen when the measure of confidence is relatively low (e.g., below a first threshold), to present the moderate-sensitivity personal information to the lock screen when the measure of confidence is somewhere between relatively low and relatively high (e.g., equal to or greater than the first threshold and below a second threshold), and to present the high-sensitivity personal information to the lock screen when the measure of confidence is relatively high (e.g., greater than the second threshold). Of course, a wide variety of other groupings may be used and displayed based on the measure of confidence.

In some embodiments, the amount of content and/or metadata associated with a message, notification, or other item of personal information displayed to the lock screen may be controlled based on the measure of confidence. For example, if lock screen management logic 142 determines that the measure of confidence is relatively low, lock screen management logic 142 may display a message that an e-mail or text message was received from a particular party but not display any of the message content. However, if lock screen management logic 142 determines that the measure of confidence is relatively high, lock screen management logic 142 may also display some or all of the actual content of the e-mail or text message. As another example, if lock screen management logic 142 determines that the measure of confidence is relatively low, lock screen management logic 142 may display a reminder about an upcoming meeting that includes only the date, time and location of the meeting. However, if lock screen management logic 142 determines that the measure of confidence is relatively high, lock screen management logic 142 may display a reminder about the upcoming meeting that also includes the subject of the meeting and a list of people attending the meeting. In certain embodiments, a degree of aggressiveness of privacy filtering applied to content to be rendered to the lock screen may be controlled based on the measure of confidence.

In a further embodiment, the determination of what type of personal information should be revealed at different measures of confidence levels may be controlled by certain settings. Such settings may comprise part of a set of lock screen management setting 140 stored in memory 104 of computing device 100 (see FIG. 1). In one embodiment, the settings are specified by a developer and are not modifiable by a user. In an alternate embodiment, the settings are configurable by an authorized user of computing device 100. This feature enables, for example, an authorized user to specify what types of personal information should be displayed on the lock screen for different measures of confidence. For example, a user who is deeply concerned about privacy may require a relatively high measure of confidence to be achieved before personal information may be revealed on the lock screen, while a user who is not as concerned about privacy may require only a relatively low measure of confidence to be achieved before personal information may be revealed on the lock screen. In still another embodiment, the settings may be configurable by a system administrator in an enterprise.

As noted above, based on the measure of confidence received from measure of confidence generation logic 134, lock screen management logic 142 may also determine whether and what type of functionality should be rendered accessible to a user via the lock screen and provides access to such functionality (if any) via the lock screen.

For example, in one embodiment, when the measure of confidence that the user is an authorized user is relatively low, lock screen management logic 142 will present access to no functionality via the lock screen. In an alternate embodiment, when the measure of confidence is relatively low, lock screen management logic 142 may present access to only a limited set of functionality via the lock screen. For example, the lock screen may be used to provide access to camera 116 of computing device 100 for the purposes of taking pictures but may not allow a user to access photos stored on computing device 100.

In further accordance with this example, when the measure of confidence that the user is an authorized user is relatively high, lock screen management logic 142 will provide access to more functionality of computing device 100 via the lock screen. For example, when the measure of confidence is relatively high, lock screen management logic 142 may be used to provide access to camera 116 of computing device 100 for the purposes of taking pictures and may also allow a user to access photos stored on computing device 100.

Lock screen management logic 142 may selectively provide access to a wide variety of different types of functionality of computing device 100 when lock screen management logic 142 determines that the measure of confidence is sufficiently high. For example and without limitation, the functionality to which access may be selectively provided may include functionality of a phone within computing device 100, functionality of camera 116, functionality of a media viewer or player, functionality of a digital personal assistant, functionality of a Web browser, functionality of operating system 124, or functionality of any of applications $122_1$-$122_N$. Application functionality may include, for example and without limitation, the ability to access, view and update a calendar, the ability to draft and send e-mails and text messages, or the like. However, there are merely a few examples and persons skilled in the relevant art(s) will readily appreciate that lock screen management logic 142 may provide access to a wide variety of functionality via the lock screen when the measure of confidence is deemed sufficiently high.

In one embodiment, the functionality that may be accessed via the lock screen may be organized into different groups or tiers. For example, the functionality that may be accessed via the lock screen may be organized into different tiers based on how sensitive a user would be to inadvertently allowing a third person to access such functionality, such as a low-sensitivity tier, a moderate-sensitivity tier, and a high-sensitivity tier. In further accordance with this example, lock screen management logic 142 may be configured to provide access to the low-sensitivity functionality via the lock screen when the measure of confidence is relatively low, to provide access to the moderate-sensitivity functionality via the lock screen when the measure of confidence is somewhere between relatively low and relatively high, and to provide access to the high-sensitivity functionality via the lock screen when the measure of confidence is relatively high. Of course, a wide variety of other groupings may be used and rendered accessible based on the measure of confidence.

In a further embodiment, the determination of what type of functionality should be rendered accessible at different measures of confidence levels may be controlled by certain settings. Such settings may comprise part of a set of lock screen management setting 140 stored in memory 104 of computing device 100. In one embodiment, the settings are specified by a developer and are not modifiable by a user. In an alternate embodiment, the settings are configurable by an authorized user of computing device 100. This feature enables, for example, an authorized user to specify what types of functionality should be rendered accessible on the lock screen for different measures of confidence. In still another embodiment, the settings may be configurable by a system administrator in an enterprise.

In an embodiment, the aforementioned interactions between the components shown in FIG. 2 may be carried out on a continuous basis, such as on an intermittent or periodic basis. For example, while computing device 100 is in the locked state, biometric matching logic 136 may periodically or intermittently obtain new biometric data from biometric sensor(s) 114 and generate new biometric matching determination(s) based on the new biometric data. Based on the new biometric matching determinations, measure of confidence generation logic 134 may generate a new measure of confidence and provide it to lock screen management logic 142. Based on the new measure of confidence, lock screen management logic 142 may selectively determine whether to maintain, increase or reduce the amount or types of personal information to display to the lock screen and/or the amount or types of functionality to render accessible via the lock screen. For example, if the measure of confidence increases over time, lock screen management logic 142 may increase the amount or types of personal information presented to the lock screen; however, if the measure of confidence decreases over time, lock screen management logic 142 may reduce the amount or types of personal information presented to the lock screen. As another example, if the measure of confidence increases over time, lock screen management logic 142 increase the amount or types of functionality rendered accessible via the lock screen; however, if the measure of confidence decreases over time, lock screen management logic 142 may reduce the amount or types of functionality rendered accessible via the lock screen.

In one embodiment, when the measure of confidence that is generated by measure of confidence generation logic 134 is determined to be sufficiently high, user logon and authentication logic 132 will transition computing device 100 from the locked state to the unlocked state. This may entail removing the lock screen and providing the user with access to a new user interface, such as the OS user interface provided by OS user interface logic 138. It is noted, however, that computing device 100 may also provide additional mechanisms by which a user can transition computing device 100 to an unlocked state, such as by providing a password, PIN, gesture, or the like. That is to say, the use of the measure of confidence to unlock computing device 100 does not foreclose the use of other unlocking techniques. Furthermore, in some embodiments, the test for a sufficiently high measure of confidence may be combined with other credential-providing mechanisms to support a multi-factor user authentication scheme. Thus, for example, unlocking computing device 100 may be premised both on the generation of a sufficiently-high measure of confidence and the provision of a password, PIN, gesture, or some other user credential. In still further embodiments, the measure of confidence that is generated by measure of confidence generation logic 134 is not used to determine when to unlock computing device 100.

Figure 3:
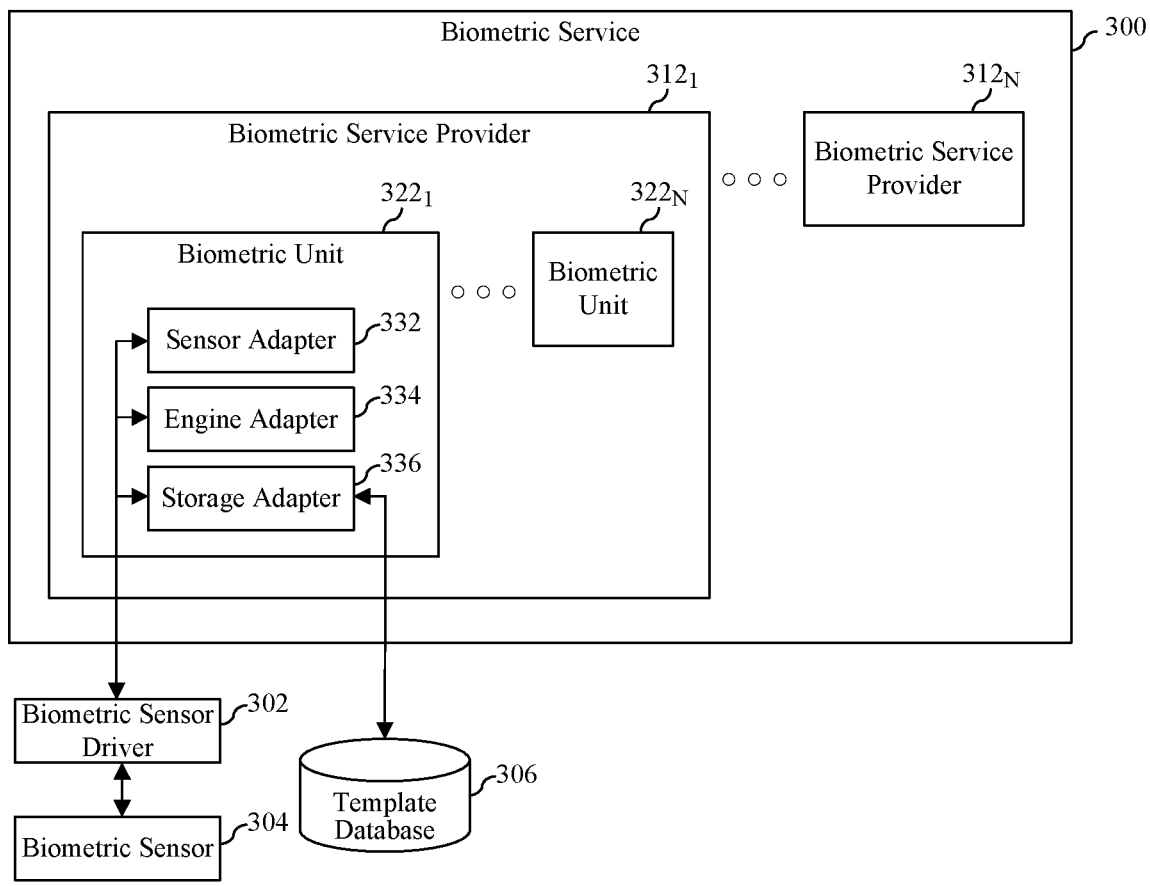
FIG. 3 is a block diagram of a software-based biometric service that may be implemented by the computing device of FIG. 1 in accordance an embodiment.

FIG. 3 is a block diagram of a software-implemented biometric service 300 that may comprise biometric matching logic 136 in accordance with one example implementation. Biometric service 300 may comprise a privileged service that manages the biometric hardware of computing device 100 and that captures, manipulates and saves biometric data.

As shown in FIG. 3, biometric service 300 comprises one or more biometric service providers $312_1$-$312_N$. Each one of biometric service providers $312_1$-$312_N$ comprises a software object that manages a single category of biometric devices. For example, fingerprint readers may make up one category and iris scanners may make up another category. Each one of biometric service providers $312_1$-$312_N$ implements any policy that is unique to a particular category.

As further shown in FIG. 3, each one of biometric service providers $312_1$-$312_N$ comprises one or more biometric units $322_1$-$322_N$. A biometric unit comprises a software object that is operable to capture and process biometric samples and to create, save and match biometric templates. A single biometric unit includes a sensor adapter, an engine adapter and a storage adapter. Thus, for example, biometric unit $322_1$ includes a sensor adapter 332, an engine adapter 334 and a storage adapter 336. Sensor adapter 332 is a component of biometric unit $322_1$ that provides a standard interface for configuring a biometric sensor, such as biometric sensor 304, for capturing samples and for controlling the flow of biometric data to engine adapter 334. Engine adapter 334 is a component of biometric unit $322_1$ that is operable to generate biometric templates from captured samples, for indexing templates, and for matching samples to existing templates to render biometric matching determinations. Storage adapter 336 is a component of biometric unit $322_1$ that is operable to manage template databases such as template database 306. Template database 306 comprises a biometric template repository. As shown in FIG. 3, all communication between biometric unit $322_1$ and biometric sensor 304 is carried out via a biometric sensor driver 302.

It is noted that biometric service 300 is described herein by way of example only. Persons skilled in the relevant art(s) will readily appreciate that biometric matching logic 136 of computing device 100 may be implemented using various other types of software architectures and objects. Consequently, the description of biometric service 300 is not intended to be limiting.

Figure 4:
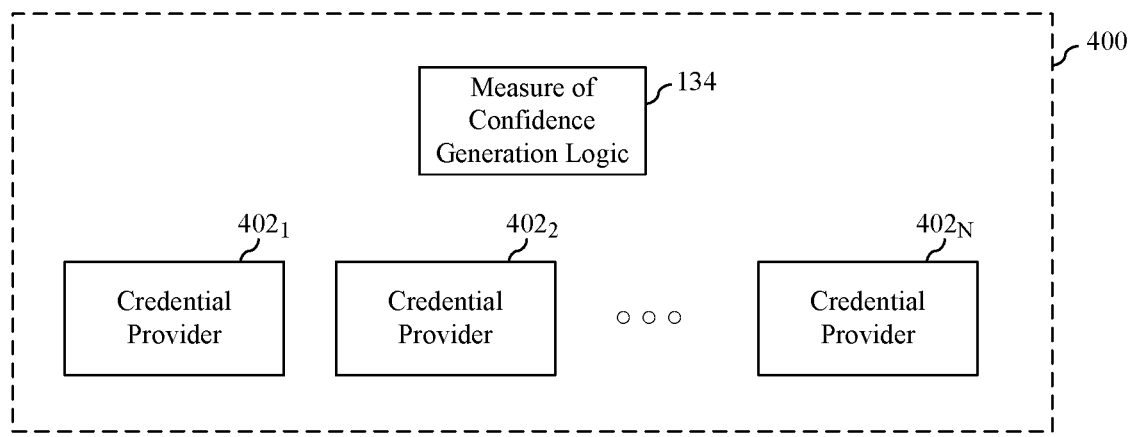
FIG. 4 is a block diagram of a software-based credential provider service that may be implemented by the computing device of FIG. 1 in accordance with an embodiment.

FIG. 4 is a block diagram of a software-implemented credential provider service 400 that may include measure of confidence generation logic 134 in accordance with an embodiment. Credential provider service 400 may comprise a software layer that resides between user logon and authentication logic 132 and biometric matching logic 136 (which as noted above, may be implemented as part of biometric service 300). Generally speaking, credential provider service 400 operates to supply credentials to user logon and authentication logic 132 that may be sufficient to unlock computing device 100.

As shown in FIG. 4, credential provider service includes one or more credential providers $402_1$-$402_N$. Generally speaking, each one of credential providers $402_1$-$402_N$ may be used to obtain credentials from different sources and to submit such credentials to user logon and authentication logic 132. In an embodiment, each one of credential providers $402_1$-$402_N$ may be registered with operating system 124 and may be configured to describe particular credential information required for user authentication, to manage communication with any external authentication authorities, and to package credentials for logon.

In an embodiment, one or more of credential providers $402_1$-$402_N$ is operable to interact with biometric matching logic 136 for the purpose of obtaining biometric matching determinations therefrom. Such biometric matching determinations may be obtained in order to supply a biometric-based credential to user logon and authentication logic 132. However, in accordance with an embodiment, such biometric matching determinations may also be obtained and provided to measure of confidence generation logic 134 in order to generate a measure of confidence that can be utilized to support the selective providing of personal information and access to functionality on a lock screen as described above.

Since credential provider service 400 is configured to receive biometric matching determinations from biometric matching logic 136 for the purposes of supplying biometric-based credentials and since measure of confidence generation logic 134 must also receive such biometric matching determinations, credential provider service 400 comprises a practical point of implementation for measure of confidence generation logic 134. However, measure of confidence generation logic 134 need not be implemented as part of credential provider service 400 and in alternate embodiments, measure of confidence generation logic 134 may comprise part of biometric matching logic 136, user logon and authentication logic 132, or some other part of operating system 124.

Figure 5:
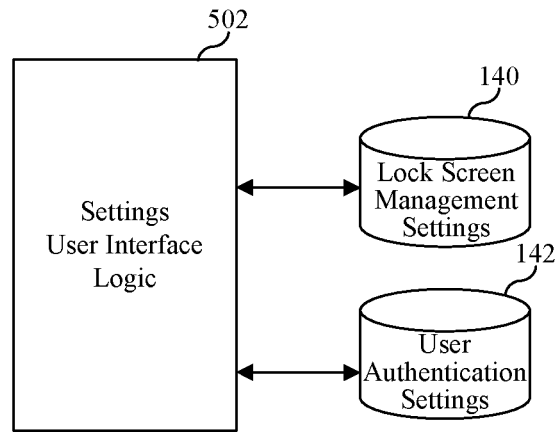
FIG. 5 is a block diagram of a first system for configuring settings that control the selective presentation of personal information and access to functionality on a lock screen based on a biometric user authentication process in accordance with an embodiment.

FIG. 5 is a block diagram of a first system for configuring settings that control the selective presentation of personal information and access to functionality on a lock screen based on a biometric user authentication process in accordance with an embodiment.

As noted above, in accordance with certain embodiments of computing device 100, a user may configure settings that correlate different biometric matching determinations to different measures of confidence. In the embodiment shown in FIG. 5, settings user interface logic 502 that is stored in memory 104 and executed by processing unit 102 of computing device 100 generates a user interface (e.g., a GUI rendered to display 106) by which a user of computing device 100 can configure such settings, which are then stored as part of user authentication settings 142.

As also noted above, in accordance with certain embodiments of computing device 100, a user may configure settings that correlate different types of personal information to be rendered to the lock screen or different types of functionality to which access is provided via the lock screen to different measures of confidence. In the embodiment shown in FIG. 5, settings user interface logic 502 that is stored in memory 104 and executed by processing unit 102 of computing device 100 generates a user interface (e.g., a GUI rendered to display 106) by which a user of computing device 100 can configure such settings, which are then stored as part of lock screen management settings 140.

Figure 6:
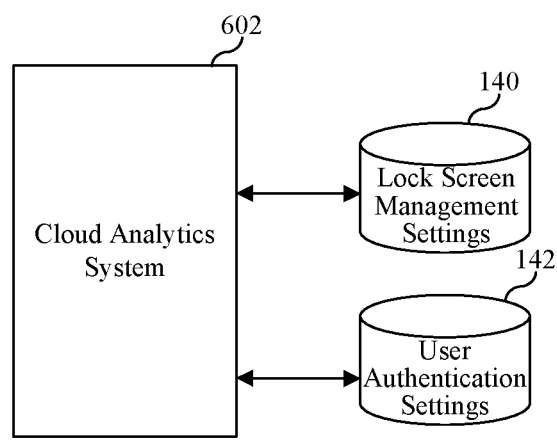
FIG. 6 is a block diagram of a second system for configuring settings that control the selective presentation of personal information and access to functionality on a lock screen based on a biometric user authentication process in accordance with an embodiment.

FIG. 6 is a block diagram of a second system for configuring settings that control the selective presentation of personal information and access to functionality on a lock screen based on a biometric user authentication process in accordance with an embodiment.

In the system of FIG. 6, a cloud analytics system 602 operates to receive user feedback and/or other signals from a plurality of computing devices that, like computing device 100, provide for the selective presentation of personal information and access to functionality on a lock screen based on a biometric user authentication process. Such signals may relate, for example, to the accuracy of the measure of confidence generated by measure of confidence generation logic 134. Such signals may also related to the effectiveness of the criteria (e.g., thresholds) applied to the measure of confidence by lock screen management logic 142 in preventing third party access to personal information and device functionality. Such signals may be received, for example, via one or more networks that connect the computing devices to cloud analytics system 602. The signals received from the plurality of computing devices are analyzed by cloud analytics system 600 to determine whether or not the aforementioned settings are resulting in a desired level of performance and/or a desired user experience for the selective presentation feature. Based on the results of the analysis, cloud analytics system 602 may operate to modify the settings stored in lock screen management settings 140 and/or user authentication settings 142.

Figure 7:
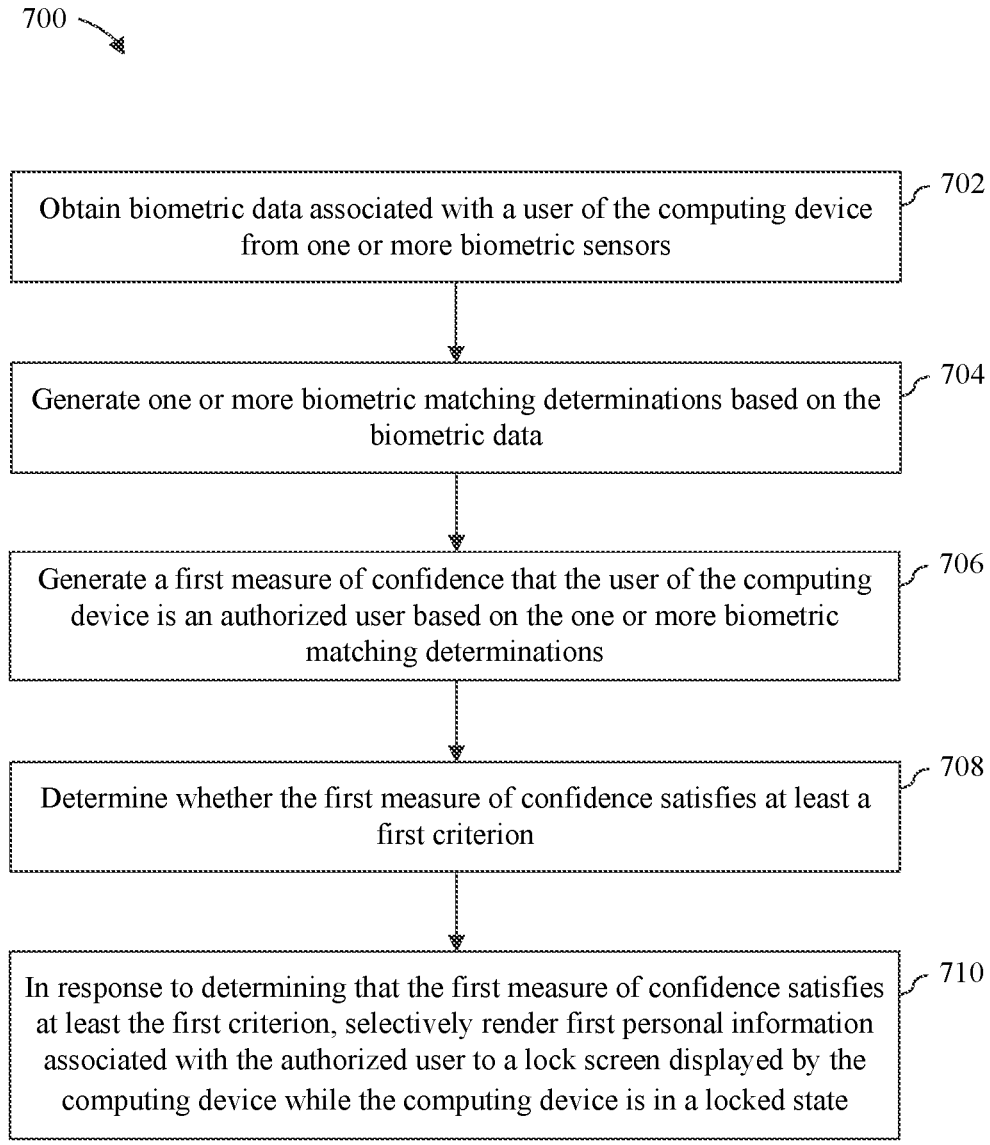
FIG. 7 depicts a flowchart of a method for selectively presenting personal information to a lock screen of a computing device in accordance with an embodiment.

FIG. 7 depicts a flowchart 700 of a method for selectively presenting personal information to a lock screen of a computing device in accordance with an embodiment. The method of flowchart 700 will now be described with continued reference to various components of computing device 100 of FIG. 1. However, the method is not limited to that embodiment.

As shown in FIG. 7, the method of flowchart 700 begins at step 702, in which biometric data associated with a user of a computing device is obtained from one or more biometric sensors. This step may be performed, for example, by biometric matching logic 136 of computing device 100, which operates to obtain biometric data from biometric sensor(s) 114. As discussed above, the biometric sensor(s) may include one or more of: a fingerprint recognition sensor, a palm print recognition sensor, a face recognition sensor, an iris recognition sensor, a retina recognition sensor, a voice recognition sensor, a hand vascular pattern recognition sensor, a DNA recognition sensor, and a signature recognition sensor. As also discussed above, the biometric sensor(s) may also comprise one or more sensors capable of obtaining data indicative of one or more behavioral characteristics of a user.

At step 704, one or more biometric matching determinations are generated based on the biometric data obtained in step 702. This step may also be performed, for example, by biometric matching logic 136 of computing device 100.

At step 706, a first measure of confidence that the user of the computing device is an authorized user is generated based on the one or more matching determinations. This step may be performed, for example, by measure of confidence generation logic 134 of computing device 100.

In one embodiment, the first measure of confidence is generated based at least in part on a setting that correlates different biometric matching determinations to different measures of confidence. For example, as discussed above in reference to computing device 100, such a setting may be stored as part of user authentication settings 142. As was also discussed above, such a setting may be configured by an authorized user of the computing device or modified based on an analysis of data collected from a plurality of computing devices.

At step 708, it is determined whether the measure of confidence satisfies at least a first criterion. This step may be performed, for example, by lock screen management logic 142 of computing device 100, which as discussed above, determines whether or not the measure of confidence meets one or more criteria in order to determine whether or not to selectively display personal information on the lock screen.

At step 710, in response to determining that the first measure of confidence satisfies at least the first criterion, first personal information associated with the authorized user is selectively rendered to the lock screen of the computing device while the computing device is in a locked state. This step may also be performed, for example, by lock screen management logic 142 of computing device 100.

As was discussed above, the first personal information may include at least one of: a notification concerning a communication (e.g., phone call, e-mail or text message) received by the authorized user, a reminder about a task associated with the authorized user (e.g., a task being tracked by a calendar application, a to-do-list application, or the like), some or all of a message (e.g., e-mail or text message) received by the authorized user, an identifier of the authorized user (e.g., a name, account name, e-mail address, or other identifier of the authorized user), an identifier of a party calling the authorized user, an image associated with the authorized user (e.g., an image of and/or selected by the authorized user), calendar information associated with the authorized user, a personalized greeting associated with the authorized user, health-related data associated with the authorized user, information concerning events deemed to be of interest to the authorized user, and geographical information associated with the authorized user (e.g., walking or driving directions requested by the authorized user or a map showing the authorized user's location and/or trajectory).

In one embodiment, the first personal information is identified based on a setting that correlates different types of personal information to be rendered to the lock screen to different measures of confidence. For example, as discussed above in reference to computing device 100, such a setting may be stored as part of lock screen management settings 142. As was also discussed above, such a setting may be configured by an authorized user of the computing device or modified based on an analysis of data collected from a plurality of computing devices.

FIG. 8 depicts an additional step 802 that may be performed in conjunction with the method shown in flowchart 700 of FIG. 7. As shown in FIG. 8, in step 802, in response to determining that the first measure of confidence does not satisfy at least the first criterion, personal information associated with the authorized user is removed from the lock screen. This step may also be performed, for example, by lock screen management logic 142 of computing device 100.

FIG. 9 depicts a flowchart 900 of an additional method for selectively presenting personal information to a lock screen of a computing device that may be performed in conjunction with the method shown in flowchart 700 of FIG. 7. As shown in FIG. 9, the method of flowchart 900 begins at step 902, in which a second measure of confidence that the user of the computing device is the authorized user is generated based on one or more additional biometric matching determinations. This step may be performed, for example, by measure of confidence generation logic 134 of computing device 100.

At step 904, it is determined whether the second measure of confidence satisfies at least a second criterion, wherein the second criterion is different from the first criterion. This step may be performed, for example, by lock screen management logic 142 of computing device 100.

At step 906, in response to determining that the second measure of confidence satisfies at least the second criterion, second personal information associated with the authorized user is rendered to the lock screen, wherein the second personal information is different than the first personal information. This step may also be performed, for example, by lock screen management logic 142 of computing device 100.

In one example embodiment, the first criterion mentioned in flowchart 700 is a first threshold that the measure of confidence must exceed in order for the first personal information to be presented to the lock screen and the second criterion mentioned in flowchart 900 is a second threshold that is greater than the first threshold and that must be exceeded in order for the second personal information to be presented to the lock screen. Thus, when the measure of confidence passes the first threshold, only the first personal information is displayed, but when the measure of confidence passes the second threshold, both the first personal information and the second personal information may be displayed. Accordingly, as the measure of confidence increases, more and more personal information may be selectively presented to the lock screen. However, this is merely one example and the methods of flowcharts 700 and 900 are not so limited.

Figure 10:
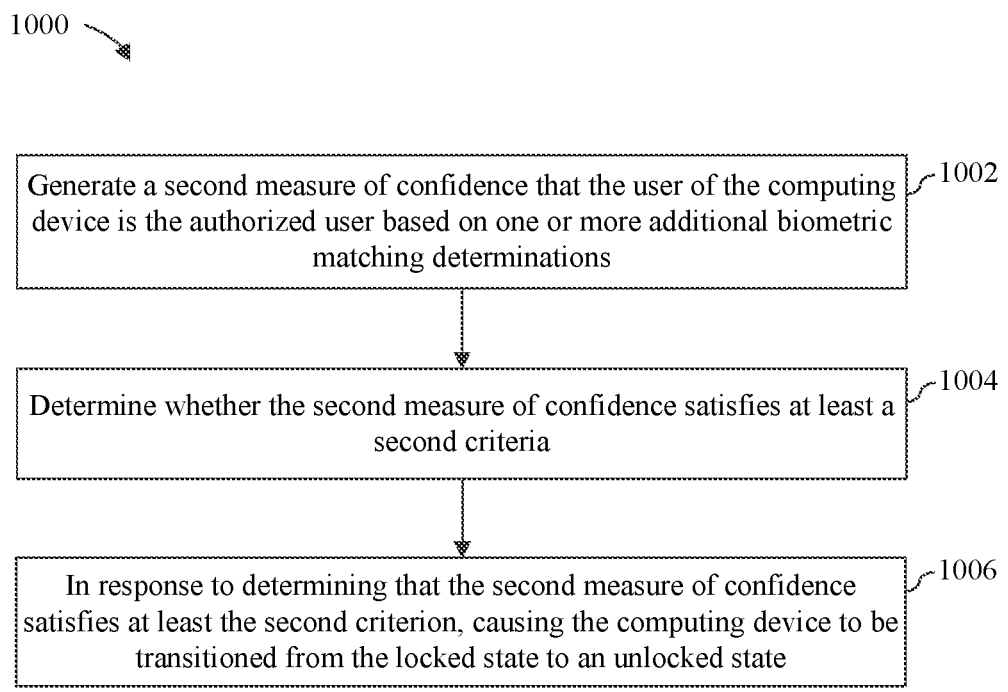
FIG. 10 depicts a flowchart of yet another method that may be performed in conjunction with the method shown in FIG. 7.

FIG. 10 depicts a flowchart 1000 of yet another method that may be performed in conjunction with the method shown in flowchart 700 of FIG. 7. As shown in FIG. 9, the method of flowchart 900 begins at step 1002, in which a second measure of confidence that the user of the computing device is the authorized user is generated based on one or more additional biometric matching determinations. This step may be performed, for example, by measure of confidence generation logic 134 of computing device 100.

At step 1004, it is determined whether the second measure of confidence satisfies at least a second criterion, wherein the second criterion is different from the first criterion. This step may be performed, for example, by lock screen management logic 142 of computing device 100.

At step 1006, in response to determining that the second measure of confidence satisfies at least the second criterion, the computing device is transitioned from the locked state to the unlocked state. This step may be performed, for example, by lock screen management logic 142 and/or user logon and authentication logic 132 of computing device 100.

In one example embodiment, the first criterion mentioned in flowchart 700 is a first threshold that the measure of confidence must exceed in order for the first personal information to be presented to the lock screen and the second criterion mentioned in flowchart 1000 is a second threshold that is greater than the first threshold and that must be exceeded in order for the computing device to be transitioned from the locked state to the unlocked state. Thus, when the measure of confidence passes the first threshold, the first personal information is displayed on the lock screen, but when the measure of confidence passes the second threshold, the computing device is fully unlocked. However, this is merely one example and the methods of flowcharts 700 and 1000 are not so limited.

Figure 11:
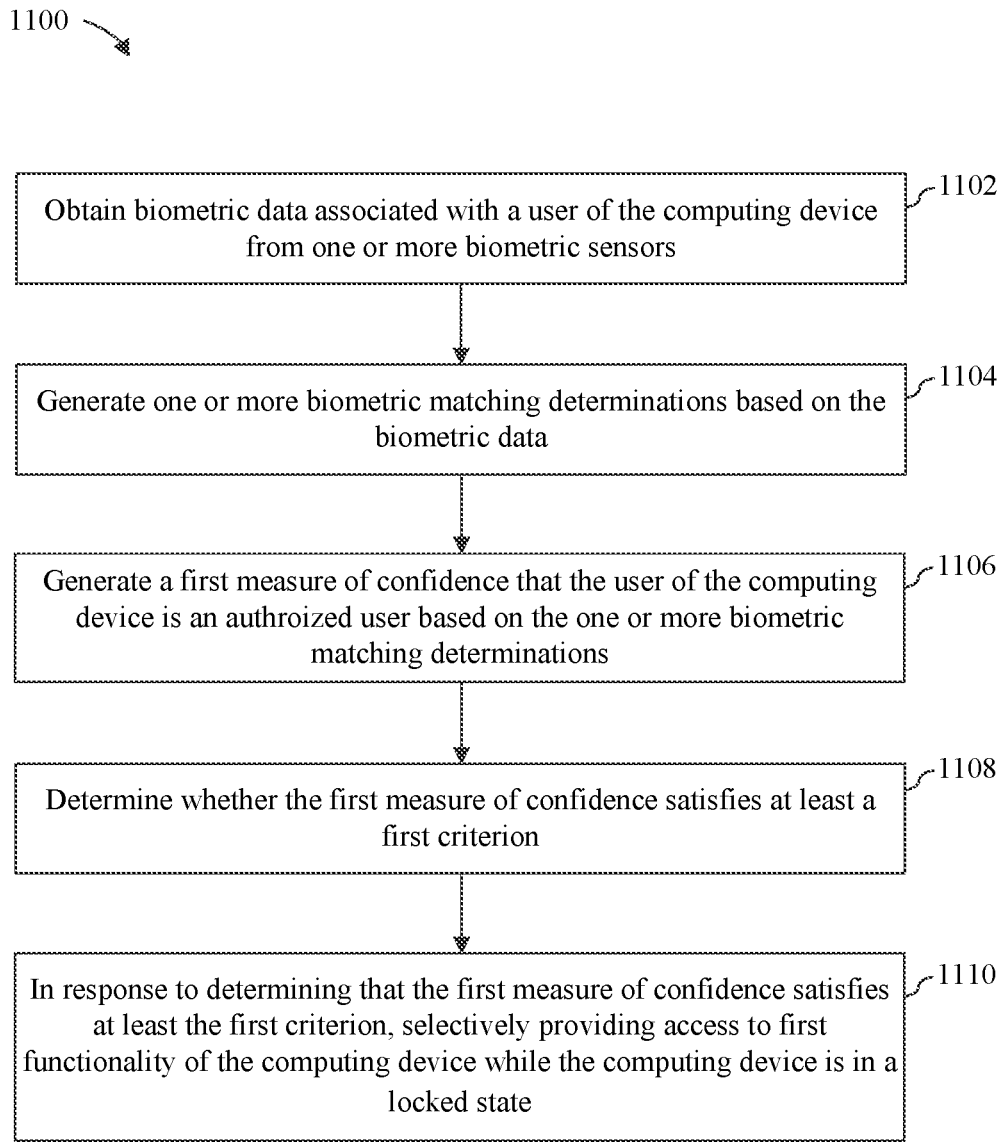
FIG. 11 depicts a flowchart of a method for selectively providing access to functionality via a lock screen of a computing device in accordance with an embodiment.

FIG. 11 depicts a flowchart of a method for selectively providing access to functionality via a lock screen of a computing device in accordance with an embodiment. The method of flowchart 1100 will now be described with continued reference to various components of computing device 100 of FIG. 1. However, the method is not limited to that embodiment.

As shown in FIG. 11, the method of flowchart 1100 begins at step 1102, in which biometric data associated with a user of a computing device is obtained from one or more biometric sensors. This step may be performed, for example, by biometric matching logic 136 of computing device 100, which operates to obtain biometric data from biometric sensor(s) 114. As discussed above, the biometric sensor(s) may include one or more of: a fingerprint recognition sensor, a palm print recognition sensor, a face recognition sensor, an iris recognition sensor, a retina recognition sensor, a voice recognition sensor, a hand vascular pattern recognition sensor, a DNA recognition sensor, and a signature recognition sensor. As also discussed above, the biometric sensor(s) may also comprise one or more sensors capable of obtaining data indicative of one or more behavioral characteristics of a user.

At step 1104, one or more biometric matching determinations are generated based on the biometric data obtained in step 1102. This step may also be performed, for example, by biometric matching logic 136 of computing device 100.

At step 1106, a first measure of confidence that the user of the computing device is an authorized user is generated based on the one or more matching determinations. This step may be performed, for example, by measure of confidence generation logic 134 of computing device 100.

In one embodiment, the first measure of confidence is generated based at least in part on a setting that correlates different biometric matching determinations to different measures of confidence. For example, as discussed above in reference to computing device 100, such a setting may be stored as part of user authentication settings 142. As was also discussed above, such a setting may be configured by an authorized user of the computing device or modified based on an analysis of data collected from a plurality of computing devices.

At step 1108, it is determined whether the measure of confidence satisfies at least a first criterion. This step may be performed, for example, by lock screen management logic 142 of computing device 100, which as discussed above, determines whether or not the measure of confidence meets one or more criteria in order to determine whether or not to selectively display personal information on the lock screen.

At step 1110, in response to determining that the first measure of confidence satisfies at least the first criterion, access is selectively provided to first functionality of the computing device while the computing device is in a locked state. Such access may be provided, for example, via the lock screen. This step may also be performed, for example, by lock screen management logic 142 of computing device 100.

As was discussed above, the first functionality may comprise, for example, functionality of a phone of the computing device, functionality of a camera of the computing device, functionality of a media viewer or player, functionality of a digital personal assistant, functionality of a Web browser, functionality of an operating system, or functionality of an application. Application functionality may include, for example and without limitation, the ability to access, view and update a calendar, the ability to draft and send e-mails and text messages, or the like.

In one embodiment, the first functionality is identified based on a setting that correlates different types of functionality to be rendered accessible via the lock screen to different measures of confidence. For example, as discussed above in reference to computing device 100, such a setting may be stored as part of lock screen management settings 142. As was also discussed above, such a setting may be configured by an authorized user of the computing device or modified based on an analysis of data collected from a plurality of computing devices.

FIG. 12 depicts an additional step that may be performed in conjunction with the method shown in FIG. 11. As shown in FIG. 12, in step 1202, in response to determining that the first measure of confidence does not satisfy at least the first criterion, access to the first functionality of the computing device is selectively prohibited while the computing device is in the locked state. This step may also be performed, for example, by lock screen management logic 142 of computing device 100.

FIG. 13 depicts a flowchart of an additional method for selectively providing access to functionality via a lock screen of a computing device that may be performed in conjunction with the method shown in FIG. 11. As shown in FIG. 13, the method of flowchart 1300 begins at step 1302, in which a second measure of confidence that the user of the computing device is the authorized user is generated based on one or more additional biometric matching determinations. This step may be performed, for example, by measure of confidence generation logic 134 of computing device 100.

At step 1304, it is determined whether the second measure of confidence satisfies at least a second criterion, wherein the second criterion is different from the first criterion. This step may be performed, for example, by lock screen management logic 142 of computing device 100.

At step 1306, in response to determining that the second measure of confidence satisfies at least the second criterion, access is selectively provided to second functionality of the computing device while the computing device is in the locked state, wherein the second personal information is different than the first personal information. Such access may be provided, for example, via the lock screen. This step may also be performed, for example, by lock screen management logic 142 of computing device 100.

In one example embodiment, the first criterion mentioned in flowchart 1100 is a first threshold that the measure of confidence must exceed in order for the first functionality to be rendered accessible via the lock screen and the second criterion mentioned in flowchart 1300 is a second threshold that is greater than the first threshold and that must be exceeded in order for the second functionality to be rendered accessible via the lock screen. Thus, when the measure of confidence passes the first threshold, access is rendered only to the first functionality, but when the measure of confidence passes the second threshold, access is rendered to both the first functionality and the second functionality. Accordingly, as the measure of confidence increases, more and more functionality may be selectively rendered accessible via the lock screen. However, this is merely one example and the methods of flowcharts 1100 and 1300 are not so limited.

In the foregoing embodiments, access to personal information or functionality of a computing device is selectively provided via a lock screen thereof based on a measure of confidence that a current user of the computing device is an authorized user. In alternate embodiments, the computing device may instead generate based on biometric sensing a measure of confidence that a current user of the computing device is a person other than an authorized user. For example, in accordance with such embodiments, when the measure of confidence that the user is not an authorized user is relatively low, certain personal information and/or device functionality may be rendered accessible via the lock screen and when the measure of confidence that the user is not an authorized user is relatively high, such personal information and/or device functionality may be rendered inaccessible via the lock screen. Thus, the more certain the device becomes that the current user is not an authorized user, the more personal information and functionality is suppressed.

Furthermore, in the foregoing embodiments, access to personal information or functionality of a computing device is selectively provided via a lock screen thereof. However, the techniques described herein may be extended to other types of user interfaces of a computing device other than visual user interfaces such as lock screens. For example, the techniques described herein may be adapted to selectively provide access to personal information or functionality of a computing device via a voice user interface, a haptic user interface, or some other type of user interface, while the computing device is in a locked state.

III. Example Mobile Device Implementation

Figure 14:
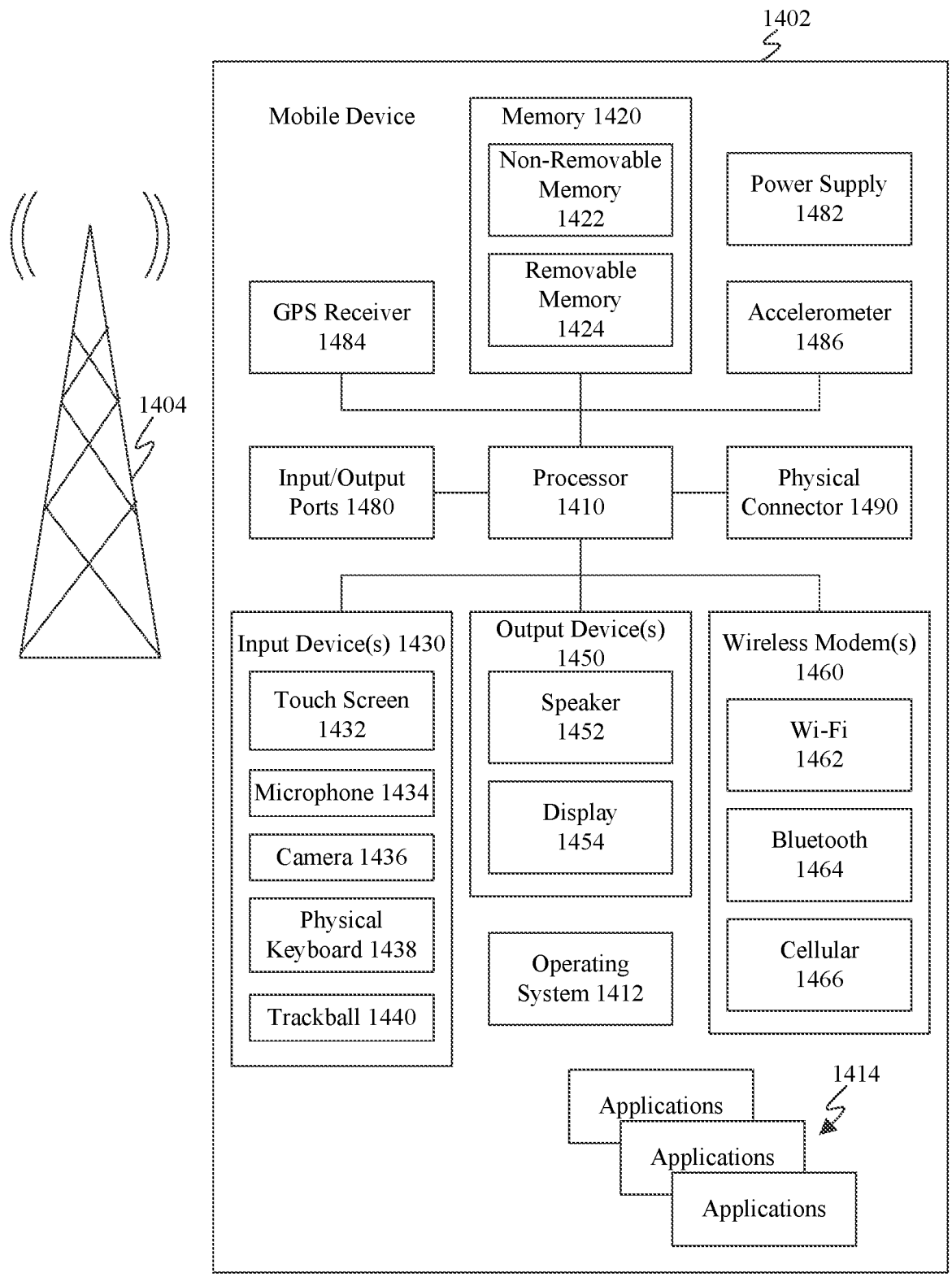
FIG. 14 is a block diagram of an example mobile device that may be used to implement various embodiments.

FIG. 14 is a block diagram of an exemplary mobile device 1402 that may implement embodiments described herein. For example, mobile device 1402 may be used to implement computing device 100 as described above in reference to FIG. 1. As shown in FIG. 14, mobile device 1402 includes a variety of optional hardware and software components. Any component in mobile device 1402 can communicate with any other component, although not all connections are shown for ease of illustration. Mobile device 1402 can be any of a variety of computing devices (e.g., cell phone, smartphone, handheld computer, Personal Digital Assistant (PDA), etc.) and can allow wireless two-way communications with one or more mobile communications networks 1404, such as a cellular or satellite network, or with a local area or wide area network.

The illustrated mobile device 1402 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components of mobile device 1402 and provide support for one or more application programs 1414 (also referred to as "applications" or "apps"). Application programs 1414 may include common mobile computing applications (e.g., digital personal assistants, e-mail applications, calendars, contact managers, web browsers, messaging applications) and any other computing applications (e.g., word processing applications, mapping applications, media player applications).

The illustrated mobile device 1402 can include memory 1420. Memory 1420 can include non-removable memory 1422 and/or removable memory 1424. Non-removable memory 1422 can include RAM, ROM, flash memory, a hard disk, or other well-known memory devices or technologies. Removable memory 1424 can include flash memory or a Subscriber Identity Module (SIM) card, which is well known in GSM communication systems, or other well-known memory devices or technologies, such as "smart cards." Memory 1420 can be used for storing data and/or code for running operating system 1412 and applications 1414. Example data can include web pages, text, images, sound files, video data, or other data to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1402 can support one or more input devices 1430, such as a touch screen 1432, a microphone 1434, a camera 1436, a physical keyboard 1438 and/or a trackball 1440 and one or more output devices 1450, such as a speaker 1452 and a display 1454. Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI).

Wireless modem(s) 1460 can be coupled to antenna(s) (not shown) and can support two-way communications between the processor 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1402 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components of mobile device 1402 are not required or all-inclusive, as any components can be deleted and other components can be added as would be recognized by one skilled in the art.

In an embodiment, mobile device 1402 is configured to perform any of the functions of computing device 100 as described above in reference to FIG. 1. Computer program logic for performing the functions of these devices may be stored in memory 1420 and executed by processor 1410. By executing such computer program logic, processor 1410 may be caused to implement any of the features of any of these devices. Also, by executing such computer program logic, processor 1410 may be caused to perform any or all of the steps of the flowcharts of FIGS. 7-13.

IV. Example Computer System Implementation

Figure 15:
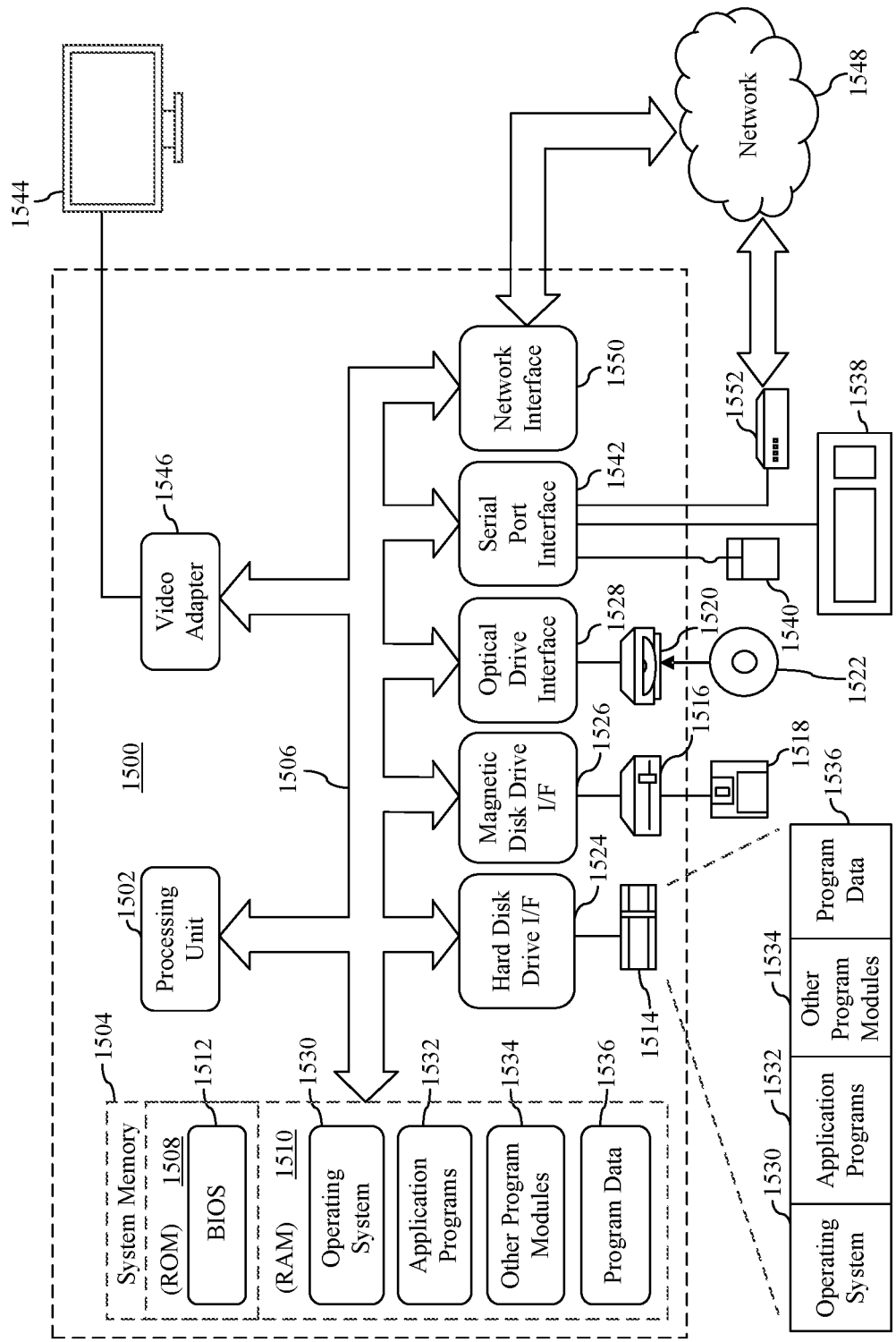
FIG. 15 is a block diagram of an example processor-based computer system that may be used to implement various embodiments.

FIG. 15 depicts an example processor-based computer system 1500 that may be used to implement various embodiments described herein. For example, system 1500 may be used to implement computing device 100 as described above in reference to FIG. 1. System 1500 may also be used to implement any or all of the steps of the flowcharts of FIGS. 7-13. The description of system 1500 provided herein is provided for purposes of illustration, and is not intended to be limiting. Embodiments may be implemented in further types of computer systems, as would be known to persons skilled in the relevant art(s).

As shown in FIG. 15, system 1500 includes a processing unit 1502, a system memory 1504, and a bus 1506 that couples various system components including system memory 1504 to processing unit 1502. Processing unit 1502 may comprise one or more microprocessors or microprocessor cores. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

System 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, BLU-RAY™ disk or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives, flash memory cards, USB thumb sticks, and the like.

A number of program modules may be stored on the hard disk, magnetic disk, optical disk, ROM, or RAM. These program modules include an operating system 1530, one or more application programs 1532, other program modules 1534, and program data 1536. In accordance with various embodiments, the program modules may include computer program logic that is executable by processing unit 1502 to perform any or all of the functions and features of any of computing device 100 as described above in reference to FIG. 1. The program modules may also include computer program logic that, when executed by processing unit 1502, performs any of the steps or operations shown or described in reference to the flowcharts of FIGS. 7-13.

A user may enter commands and information into system 1500 through input devices such as a keyboard 1538 and a pointing device 1540 (e.g., a mouse). Other input devices (not shown) may include a microphone, joystick, game controller, scanner, or the like. In one embodiment, a touch screen is provided in conjunction with a display 1544 to allow a user to provide user input via the application of a touch (as by a finger or stylus for example) to one or more points on the touch screen. These and other input devices are often connected to processing unit 1502 through a serial port interface 1542 that is coupled to bus 1506, but may be connected by other interfaces, such as a parallel port, game port, or a universal serial bus (USB). Such interfaces may be wired or wireless interfaces.

Display 1544 is connected to bus 1506 via an interface, such as a video adapter 1546. In addition to display 1544, system 1500 may include other peripheral output devices (not shown) such as speakers and printers.

System 1500 is connected to a network 1548 (e.g., a local area network or wide area network such as the Internet) through a network interface 1550, a modem 1552, or other suitable means for establishing communications over the network. Modem 1552, which may be internal or external, is connected to bus 1506 via serial port interface 1542.

As used herein, the terms "computer program medium," "computer-readable medium," and "computer-readable storage medium" are used to generally refer to memory devices or storage structures such as the hard disk associated with hard disk drive 1514, removable magnetic disk 1518, removable optical disk 1522, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including operating system 1530, application programs 1532 and other program modules 1534) may be stored on the hard disk, magnetic disk, optical disk, ROM, or RAM. Such computer programs may also be received via network interface 1550, serial port interface 1542, or any other interface type. Such computer programs, when executed by processing unit 1502, enable system 1500 to implement features of embodiments discussed herein. Accordingly, such computer programs represent controllers of the system 1500.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1500 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Additional Exemplary Embodiments

A computing device is described herein. The computing device includes one or more processors, a display, and memory that stores computer program logic for execution by the one or more processors. The computer program logic includes biometric matching logic, measure of confidence generation logic, and lock screen management logic. The biometric matching logic is configured to obtain biometric data associated with a user of the computing device from one or more biometric sensors and to generate one or more biometric matching determinations based on the biometric data. The measure of confidence generation logic is configured to generate a first measure of confidence that the user of the computing device is an authorized user based on the one or more biometric matching determinations. The lock screen management logic is configured to render a lock screen to the display of the computing device while the computing device is in a locked state. The lock screen management logic is further configured to determine whether the first measure of confidence satisfies at least a first criterion and to selectively render first personal information associated with the authorized user to the lock screen while the computing device is in the locked state in response to determining that the first measure of confidence satisfies at least the first criterion.

In one embodiment of the foregoing computing device, the lock screen management logic is further configured to receive from the measure of confidence generation logic a second measure of confidence that the user of the computing device is the authorized user, to determine whether the second measure of confidence satisfies at least a second criterion, and to selectively render second personal information associated with the authorized user to the lock screen while the computing device is in the locked state in response to determining that the second measure of confidence satisfies at least the second criterion, the second personal information being different than the first personal information.

In another embodiment of the foregoing computing device, the lock screen management logic is further configured to receive from the measure of confidence generation logic a second measure of confidence that the user of the computing device is the authorized user, to determine whether the second measure of confidence satisfies at least a second criterion, and to cause the computing device to be transitioned from the locked state to an unlocked state in response to determining that the second measure of confidence satisfies at least the second criterion.

In yet another embodiment of the foregoing computing device, the lock screen management logic is further configured to selectively remove personal information associated with the authorized user from the lock screen in response to determining that the first measure of confidence does not satisfy at least the first criterion.

In still another embodiment of the foregoing computing device, the computing device further includes the one or more biometric sensors.

In a further embodiment of the foregoing computing device, a particular one of the one or more biometric sensors is included in a device other than the computing device and the computing device further includes a communication interface via which biometric data generated by the particular one of the one or more biometric sensors is received from the device other than the computing device.

In a still further embodiment of the foregoing computing device, the one or more biometric sensors comprise one or more of: a fingerprint recognition sensor; a palm print recognition sensor; a face recognition sensor; an iris recognition sensor; a retina recognition sensor; a voice recognition sensor; a hand vascular pattern recognition sensor; a DNA recognition sensor; and a signature recognition sensor.

In another embodiment of the foregoing computing device, the biometric sensor management logic is configured to analyze the biometric sensor data to identify one or more behavioral characteristics associated with the user and to utilize the one or more behavioral characteristics to generate the one or more biometric matching determinations.

In yet another embodiment of the foregoing computing device, the first personal information comprises at least one of: a notification concerning a communication received by the authorized user; a reminder about a task associated with the authorized user; some or all of a message received by the authorized user; an identifier of the authorized user; an identifier of a party calling the authorized user; an image associated with the authorized user; calendar information associated with the authorized user; a personalized greeting associated with the authorized user; health-related data associated with the authorized user; information concerning events deemed to be of interest to the authorized user; and geographical information associated with the authorized user.

In still another embodiment of the foregoing computing device, the measure of confidence generation logic is configured to generate the first measure of confidence based at least in part on a setting that correlates different biometric matching determinations to different measures of confidence. In further accordance with such an embodiment, the setting may be one or more of: configurable by the authorized user of the computing device; and modifiable based on an analysis of data collected from a plurality of computing devices.

In a further embodiment of the foregoing computing device, the lock screen management logic is configured to identify the first personal information based on a setting that correlates different types of personal information to be rendered to the lock screen to different measures of confidence. In further accordance with such an embodiment, the setting is one or more of: configurable by the authorized user of the computing device; and modifiable based on an analysis of data collected from a plurality of computing devices.

A method performed by a computing device while in a locked state is also described herein. The method includes: obtaining biometric data associated with a user of the computing device from one or more biometric sensors; generating one or more biometric matching determinations based on the biometric data; generating a first measure of confidence that the user of the computing device is an authorized user based on the one or more biometric matching determinations; determining whether the first measure of confidence satisfies at least a first criterion; and in response to determining that the first measure of confidence satisfies at least the first criterion, selectively providing access to a first functionality of the computing device while the computing device is in the locked state.

In one embodiment of the foregoing method, selectively providing access to the first functionality of the computing device comprise selectively providing access to the functionality of: a phone; a camera; a media viewer or player; a digital personal assistant; a Web browser; or an application.

In another embodiment of the foregoing method, the method further includes: in response to determining that the first measure of confidence does not satisfy at least the first criterion, selectively prohibiting access to the first functionality of the computing device while the computing device is in the locked state.

In yet another embodiment of the foregoing method, the method further includes: generating a second measure of confidence that the user of the computing device is the authorized user based on one or more additional biometric matching determinations; determining whether the second measure of confidence satisfies at least a second criterion; and in response to determining that the second measure of confidence satisfies at least the second criterion, selectively providing access to a second functionality of the computing device while the computing device is in the locked state, the second functionality being different than the first functionality.

In still another embodiment of the foregoing method, the method further includes: generating a second measure of confidence that the user of the computing device is the authorized user based on one or more additional biometric matching determinations; determining whether the second measure of confidence satisfies at least a second criterion; and in response to determining that the second measure of confidence satisfies at least the second criterion, causing the computing device to be transitioned from the locked state to an unlocked state.

A computer program product is also described herein. The computer program product comprises a computer-readable memory having computer program logic recorded thereon that when executed by at least one processor of a computing device causes the at least one processor to perform a method while the computing device is in a locked state. The method includes: generating a measure of confidence that a user of the computing device is an authorized user; determining whether the measure of confidence satisfies at least one criterion; and in response to determining that the measure of confidence satisfies at least the one criterion, selectively rendering personal information associated with the authorized user to a lock screen displayed by the computing device while the computing device is in the locked state.

In one embodiment of the foregoing computer program product, generating the measure of confidence that the user of the computing device is the authorized user comprises generating the measure of confidence based on biometric data obtained from one or more biometric sensors.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
   a processor;
   a display; and
   memory that stores computer program logic for execution by the processor, the computer program logic including;
      biometric matching logic configured to obtain biometric data relating to a physiological characteristic of a user of the computing device from a biometric sensor and to generate a biometric matching determination based on the biometric data;
      measure of confidence generation logic configured to generate a biometrically-determined measure of confidence that the user is an authorized user based on the biometric matching determination; and
      lock screen management logic configured to render a lock screen to the display of the computing device while the computing device is in a locked state, the lock screen comprising a visual interface that is displayed before the user has provided a credential required to activate a full functionality of the computing device, the lock screen management logic being further configured to selectively determine an amount of personal information to display to the lock screen based on the measure of confidence;
      the biometric matching logic being further configured to periodically or intermittently obtain new biometric data from the biometric sensor and generate a new biometric matching determination based on the new biometric data;
      the measure of confidence generation logic being further configured to generate a new measure of confidence based on the new biometric matching determination; and
      the lock-screen management logic being further configured to selectively determine whether to maintain, increase or reduce the amount of personal information to render to the lock screen based on the new measure of confidence.

2. The computing device of claim 1, wherein the lock screen management logic is further configured to receive from the measure of confidence generation logic a further measure of confidence that the user of the computing device is the authorized user, to determine whether the further measure of confidence satisfies at least a first criterion, and to cause the computing device to be transitioned from the locked state to an unlocked state in response to determining that the further measure of confidence satisfies at least the first criterion.

3. The computing device of claim 1, further comprising: the biometric sensor.

4. The computing device of claim 1, wherein the biometric sensor is included in a device other than the computing device, the computing device further comprising:
   a communication interface via which biometric data generated by the biometric sensor is received from the device other than the computing device.

5. The computing device of claim 1, wherein the biometric sensor comprises:
   a fingerprint recognition sensor;
   a palm print recognition sensor;
   a face recognition sensor;
   an iris recognition sensor;
   a retina recognition sensor;
   a voice recognition sensor;
   a hand vascular pattern recognition sensor;
   a DNA recognition sensor; or
   a signature recognition sensor.

6. The computing device of claim 1, wherein the first personal information comprises at least one of:
   a notification concerning a communication received by the authorized user;
   a reminder about a task associated with the authorized user;
   some or all of a message received by the authorized user;
   an identifier of the authorized user;
   an identifier of a party calling the authorized user;
   an image associated with the authorized user;
   calendar information associated with the authorized user;
   a personalized greeting associated with the authorized user;
   health-related data associated with the authorized user;
   information concerning events deemed to be of interest to the authorized user; and
   geographical information associated with the authorized user.

7. The computing device of claim 1, wherein the measure of confidence generation logic is configured to generate the measure of confidence based at least in part on a setting that correlates different biometric matching determinations to different measures of confidence.

8. The computing device of claim 7, wherein the setting is one or more of:
   configurable by the authorized user of the computing device; and
   modifiable based on an analysis of data collected from a plurality of computing devices.

9. The computing device of claim 1, wherein the lock screen management logic is configured to identify the amount of personal information based on a setting that correlates different types of personal information to be rendered to the lock screen to different measures of confidence.

10. The computing device of claim 9, wherein the setting is one or more of:
    configurable by the authorized user of the computing device; and
    modifiable based on an analysis of data collected from a plurality of computing devices.

11. A method performed by a computing device while in a locked state, comprising:

obtaining biometric data relating to a physiological characteristic of a user of the computing device from a biometric sensor;

generating a biometric matching determination based on the biometric data;

generating a biometrically-determined measure of confidence that the user is an authorized user based on the biometric matching determination;

based on the measure of confidence, selectively providing access to one or more types of functionality of the computing device while the computing device is in the locked state;

periodically or intermittently obtaining new biometric data from the biometric sensor;

generating a new biometric matching determination based on the new biometric data;

generating a new measure of confidence based on the new biometric matching determination; and based on the new measure of confidence, selectively determining whether to maintain, increase or reduce the access to the one or more types of functionality of the computing device while the computing device is in the locked state.

12. The method of claim 11, wherein selectively providing access to the one or more types of functionality of the computing device comprise selectively providing access to the functionality of:
a phone;
a camera;
a media viewer or player;
a digital personal assistant;
a Web browser; or
an application.

13. The method of claim 11, further comprising:
in response to determining that the measure of confidence does not satisfy a first criterion, selectively prohibiting access to the one or more types of functionality of the computing device while the computing device is in the locked state.

14. The method of claim 11, further comprising:
generating another measure of confidence that the user of the computing device is the authorized user based on one or more additional biometric matching determinations;
determining whether the another measure of confidence satisfies at least a first criterion; and
in response to determining that the another measure of confidence satisfies at least the first criterion, causing the computing device to be transitioned from the locked state to an unlocked state.

15. A computer program product comprising a computer-readable memory having computer program logic recorded thereon that when executed by at least one processor of a computing device causes the at least one processor to perform a method while the computing device is in a locked state, the method comprising:
generating a biometrically-determined measure of confidence that a user of the computing device is an authorized user based on a biometric matching determination generated from biometric data relating to a physiological characteristic of the user obtained from a biometric sensor;

based on the measure of confidence, selectively rendering an amount of personal information to the lock screen while the computing device is in the locked state;

periodically or intermittently obtaining new biometric data from the biometric sensor;

generating a new biometric matching determination based on the new biometric data;

generating a new measure of confidence based on the new biometric matching determination; and based on the new measure of confidence, selectively determining whether to maintain, increase or reduce the amount of personal to render to the lock screen while the computing device is in the locked state.

16. The computer program product of claim 15, wherein the personal information comprises at least one of:
a notification concerning a communication received by the authorized user;
a reminder about a task associated with the authorized user;
some or all of a message received by the authorized user;
an identifier of the authorized user;
an identifier of a party calling the authorized user;
an image associated with the authorized user;
calendar information associated with the authorized user;
a personalized greeting associated with the authorized user;
health-related data associated with the authorized user;
information concerning events deemed to be of interest to the authorized user; and
geographical information associated with the authorized user.

17. The computer program product of claim 15, wherein the personal information is identified based on a setting that correlates different types of personal information to be rendered to the lock screen to different measures of confidence.

18. The computer program product of claim 17, wherein the setting is one or more of:
configurable by the authorized user of the computing device; and
modifiable based on an analysis of data collected from a plurality of computing devices.

19. The computer program product of claim 15, wherein the method further comprises:
generating a further measure of confidence that the user of the computing device is the authorized user;
determining whether the further measure of confidence satisfies at least a first criterion, and
transitioning the computing device from the locked state to an unlocked state in response to determining that the further measure of confidence satisfies at least the first criterion.

20. The computer program product of claim 15, wherein the measure of confidence generation logic is configured to generate the measure of confidence based at least in part on a setting that correlates different biometric matching determinations to different measures of confidence.

\* \* \* \* \*